(12) United States Patent
Lee

(10) Patent No.: US 11,106,094 B2
(45) Date of Patent: Aug. 31, 2021

(54) LIQUID CRYSTAL DISPLAY

(71) Applicant: Samsung Display Co., Ltd., Yongin-Si (KR)

(72) Inventor: Yong Hee Lee, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/809,514

(22) Filed: Mar. 4, 2020

(65) Prior Publication Data

US 2021/0026180 A1    Jan. 28, 2021

(30) Foreign Application Priority Data

Jul. 22, 2019    (KR) .......................... 10-2019-0088333

(51) Int. Cl.
| | |
|---|---|
| *G02F 1/1339* | (2006.01) |
| *G02F 1/1335* | (2006.01) |
| *G02F 1/1362* | (2006.01) |
| *G02F 1/1343* | (2006.01) |

(52) U.S. Cl.
CPC ...... *G02F 1/13394* (2013.01); *G02F 1/13624* (2013.01); *G02F 1/133514* (2013.01); *G02F 1/134309* (2013.01); *G02F 1/136213* (2013.01); *G02F 1/13396* (2021.01); *G02F 1/134318* (2021.01); *G02F 1/134345* (2021.01); *G02F 1/136245* (2021.01)

(58) Field of Classification Search
None
See application file for complete search history.

(56) References Cited

U.S. PATENT DOCUMENTS

2004/0223109 A1*  11/2004  Taniguchi  ......... G02F 1/136227
                                                            349/156
2017/0192280 A1*   7/2017  Kwak  ............... G02F 1/136227

FOREIGN PATENT DOCUMENTS

| KR | 10-1675372 B1    | 11/2016 |
|---|---|---|
| KR | 10-2017-0077874 A | 7/2017 |
| KR | 10-2018-0013594 A | 2/2018 |
| KR | 10-2018-0044005 A | 5/2018 |
| KR | 10-1878188 B1    | 7/2018 |

* cited by examiner

*Primary Examiner* — Phu Vu
(74) *Attorney, Agent, or Firm* — Innovation Counsel LLP

(57) ABSTRACT

A liquid crystal display comprises a plurality of pixels, wherein the pixels comprise first pixels, second pixels, and third pixels, each of the third pixels comprises a third/first pixel and a third/second pixel including spacers that are different from each other, each of the pixels comprises a transistor and an opening exposing at least part of the transistor, at least one of the first pixel and the second pixel comprises a first spacer, the third/first pixel comprises a second spacer having a smaller area than the first spacer in a plan view, the third/second pixel comprises a third spacer having a different height from the first spacer and the second spacer, the first spacer and the second spacer overlap the opening of the pixel in which the first spacer and the second spacer are respectively disposed, and the third pixels corresponds to different colors from the first pixel and the second pixel.

20 Claims, 15 Drawing Sheets

LIQUID CRYSTAL DISPLAY

CROSS-REFERENCE TO RELATED APPLICATION

This application claims priority to and the benefit of Korean Patent Application No. 10-2019-0088333 filed in the Korean Intellectual Property Office on Jul. 22, 2019, the entire contents of which are incorporated herein by reference.

BACKGROUND

(a) Field

The technical field relates to a liquid crystal display, and in detail, relates to a liquid crystal display including a spacer.

(b) Description of the Related Art

Modern liquid crystal displays include, for example, two display panels on which field generating electrodes such as a pixel electrode and a common electrode are formed, and a liquid crystal layer filled therebetween. A liquid crystal display typically generates an electric field in the liquid crystal layer by applying a voltage to the field generating electrodes, thereby determining a direction of liquid crystal molecules of the liquid crystal layer and controlling polarization of an incident light to display an image.

The above information disclosed in this Background section is only for enhancement of understanding of the background of the application.

SUMMARY

Embodiments relate to a liquid crystal display with improved display quality and reliability by minimizing disarrangement of the liquid crystal molecule and uniformly maintaining a cell gap of the liquid crystal layer.

A liquid crystal display according to an embodiment includes a plurality of pixels included in a first display panel, and a second display panel overlapping the first display panel, wherein the plurality of pixels includes a first pixel, a second pixel, and third pixels, the third pixel includes a third/first pixel and a third/second pixel including spacers that are different from each other, each of the plurality of pixels includes a transistor and an opening exposing at least part of the transistor, at least one of the first pixel and the second pixel includes a first spacer, the third/first pixel includes a second spacer having a smaller area than the first spacer in a plan view, the third/second pixel includes a third spacer having a different height from the first spacer and the second spacer, and the first spacer and the second spacer overlap the opening of the pixel in which the first spacer and the second spacer are respectively disposed, wherein the third pixels correspond to different colors from the first pixel and the second pixel.

The first display panel may include a color filter, the color filter may include a first color filter disposed in the first pixel, a second color filter disposed in the second pixel, and a third color filter disposed in the third pixel, and the thickness of the third color filter may be larger than a thickness of the first color filter and a thickness of the second color filter.

The first pixel may correspond to red or green, the second pixel may correspond to a different color from the first pixel among the red or green, and the third pixel may correspond to blue.

The first spacer may include an overlapping part covering the opening, a first extension part extending from one side of the overlapping part in a first direction, a second extension part extending from an other side of the overlapping part in the first direction, and a third extension part extending from the overlapping part in a second direction perpendicular to the first direction.

The first display panel may include a data line and a gate line connected to the transistor, the first pixel and the second pixel may be adjacent to each other, a step part where the first color filter and the second color filter may be disposed on a boundary of the first pixel and the second pixel, and at least one edge of the first extension part and the second extension part of the first spacer may be disposed to be separated from the edge of the step part closest to the edge.

A maximum distance from an upper surface of the overlapping part to the second display panel may be larger than a minimum distance from each upper surface of the first extension part and the second extension part to the second display panel.

A minimum distance from each upper surface of the first extension part and the second extension part to the second display panel may be larger than a minimum distance from the upper surface of the third extension part to the second display panel.

The first display panel may include a first substrate and a gate conductive layer disposed on the first substrate and including a gate line, a gate electrode, and a storage electrode separated from the gate electrode, a data conductive layer including a data line, a first electrode, and a second electrode may be disposed on the gate conductive layer, and a pixel electrode may be disposed on the data conductive layer, the gate electrode, the first electrode, and the second electrode may form the transistor, at least one of the first electrode and the second electrode may be electrically connected to the pixel electrode through the opening, the overlapping part may overlap one of the gate electrode and the storage electrode, and the third extension part may overlap the other of the gate electrode and the storage electrode.

A height of the third spacer may be higher than a height of the first spacer and a height of the second spacer.

The third spacer may not overlap the opening included in the third/second pixel in which the third spacer is disposed.

A liquid crystal display according to an embodiment includes a plurality of pixels, and a first display panel and a second display panel overlapping each other, wherein the first display panel includes a transistor, a data line and a gate line connected to the transistor, an opening exposing at least part of the transistor, and a first spacer overlapping at least part of the transistor, and the first spacer includes an overlapping part overlapping the opening, a first extension part extending from one side of the overlapping part in a first direction, a second extension part extending from an other side of the overlapping part in the first direction, and a third extension part extending from the overlapping part in a second direction perpendicular to the first direction.

The plurality of pixels may include a first pixel and a second pixel adjacent to the first pixel, the first pixel and the second pixel may include the first spacer, and the first spacer respectively in the first pixel and the second pixel may be separated from each other per each pixel.

The first display panel may include a color filter, the color filter includes a first color filter disposed on the first pixel and a second color filter disposed on the second pixel, a step part where the first color filter and the second color filter are overlapped may be disposed on a boundary of the adjacent first pixel and second pixel, and at least one edge of the first extension part and the second extension part of the first spacer may be disposed to be separated from the edge of the step part closest to the edge.

The first display panel may include a first substrate and a gate conductive layer disposed on the first substrate and including the gate line, a gate electrode, and a storage electrode separated from the gate electrode, a data conductive layer including the data line, a first electrode, and a second electrode may be disposed on the gate conductive layer, a pixel electrode may be disposed on the data conductive layer, the gate electrode, the first electrode, and the second electrode may form the transistor, at least one of the first electrode and the second electrode may be electrically connected to the pixel electrode through the opening, the overlapping part may overlap one of the gate electrode and the storage electrode, and the third extension part may overlap the other of the gate electrode and the storage electrode.

The first pixel and the second pixel may correspond to red or green.

The gate conductive layer may include a first gate dummy pattern overlapping the first extension part and a second gate dummy pattern overlapping the second extension part, the data conductive layer may include a first data dummy pattern overlapping the first gate dummy pattern and a second data dummy pattern overlapping the second gate dummy pattern, the first dummy pattern may include the first gate dummy pattern and the first data dummy pattern, and the second dummy pattern may include the second gate dummy pattern and the second data dummy pattern.

A minimum distance from each upper surface of the first extension part and the second extension part to the second display panel may be smaller than a maximum distance from the upper surface of the overlapping part to the second display panel.

A liquid crystal display according to an embodiment includes a plurality of pixels, and a first display panel and a second display panel, wherein the plurality of pixels include a plurality of first pixels and a plurality of second pixels corresponding to the same color, each of the plurality of pixels includes a transistor and an opening exposing at least part of the transistor, the plurality of first pixels include a first spacer overlapping the opening, the plurality of second pixels include a second spacer, and a height of the second spacer is higher than a height of the first spacer.

The plurality of first pixels and the plurality of second pixels may correspond to blue.

The plurality of first pixels and the plurality of second pixels may be disposed in a same pixel column.

According to embodiments, by expanding the spacer, it is possible to maximize the control force of the liquid crystal to prevent defects such as bruising. In addition, it is possible to provide a liquid crystal display with improved display quality and reliability by disposing the different spacers for each pixel area.

DETAILED DESCRIPTION

Figure 1:
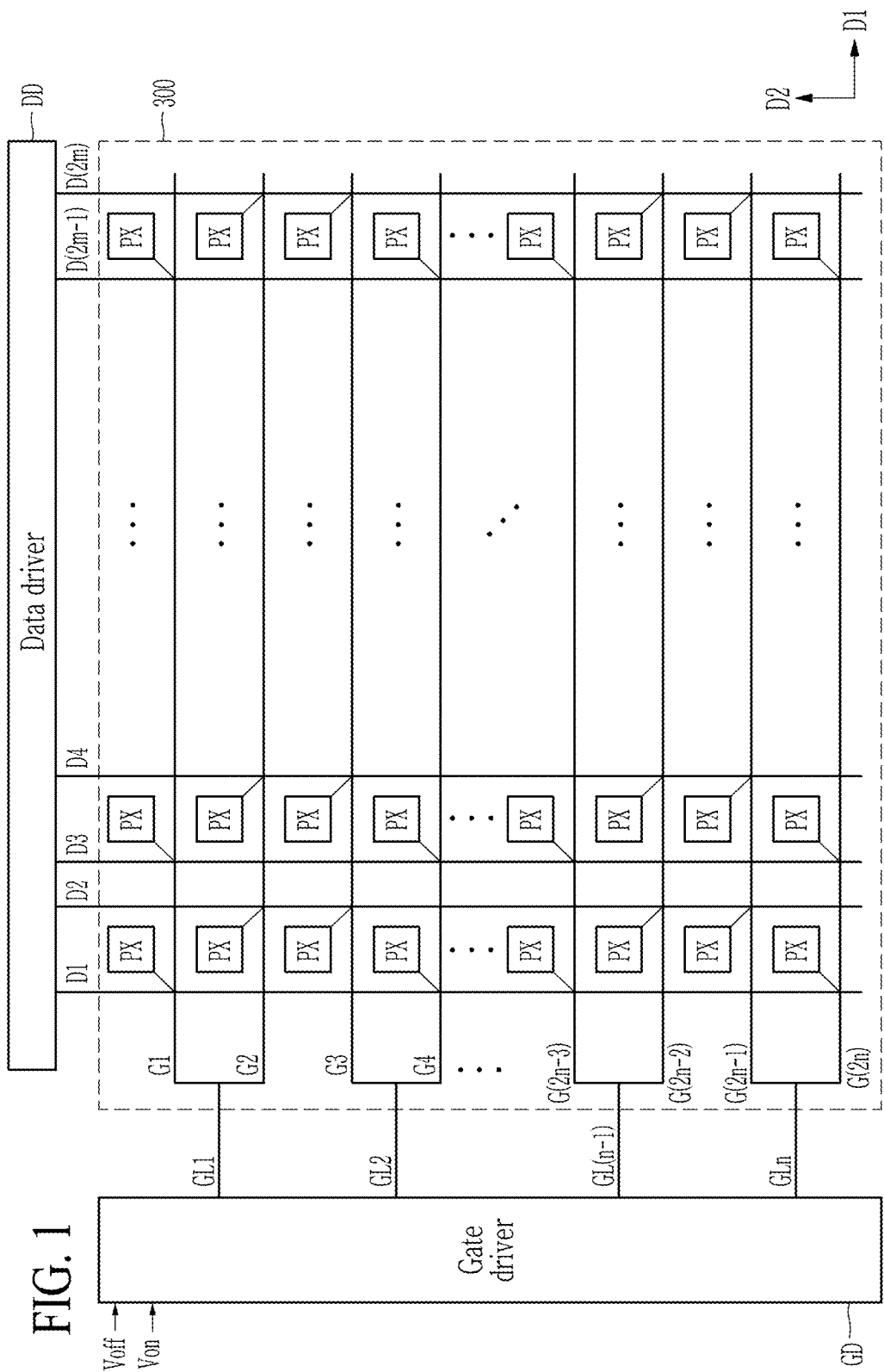
FIG. 1 is a block diagram of a display device according to an embodiment.

The present inventive concept will be described more fully hereinafter with reference to the accompanying drawings, in which embodiments of the invention are shown. The described embodiments may be modified in various different ways, all without departing from the spirit or scope of the present inventive concept.

Like reference numerals designate like elements throughout the specification.

In the drawings, the thickness of layers, films, panels, regions, etc., may be exaggerated for clarity. In the drawings, for better understanding and ease of description, the thicknesses of some layers and areas are exaggerated.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements, which may or may not overlap with each other. For conciseness, the terms "first," "second," etc. may represent "first-type (or first-set)," "second-type (or second-set)," etc., respectively.

When a first element is referred to as being "on" a second element, the first element can be directly on the second element, or one or more intervening elements may be present between the first element and the second element. When a first element is referred to as being "directly on" a second element, there are no intended intervening elements (except environmental elements such as air) present between the first element and the second element.

In the present specification, unless explicitly described to the contrary, the word "comprise" and variations such as "comprises" or "comprising" may imply the inclusion of stated elements but may not require the exclusion of any other elements. When an element extends in an indicated direction, the lengthwise direction of the element is equivalent to or parallel to the indicated direction. The term "connect" may mean "electrically connect." The term "insulate" may mean "electrically insulate."

Now, a display device according to an embodiment is described with reference to FIG. 1. FIG. 1 is a block diagram of a display device according to an embodiment.

Referring to FIG. 1, the display device according to an embodiment includes a display panel 300, a gate driver GD, and a data driver DD.

The display panel 300 may include a plurality of pixels PX, a plurality of gate lines G1—G(2n) (n is a positive integer) connected to the plurality of pixels PX, and a plurality of data lines D1—D(2m) (m is a positive integer) connected to the plurality of pixels PX.

The plurality of pixels PX may be arranged in a first direction D1 and a second direction D2 in a matrix shape (or a two-dimensional array). Hereinafter, the first direction D1 is referred to as a row direction and the second direction D2 is referred to as a column direction. Each of the plurality of pixels PX may include a pixel electrode 191 (referring to FIG. 3) and a transistor Q (referring to FIG. 3).

To implement a color display, each pixel PX displays one of a set of primary colors, and allows the desired color to be recognized (by, for example, a user) through a spatial and temporal sum of these primary colors. Examples of the set of primary colors include three primary colors such as red, green, and blue.

Each of the plurality of main gate lines GL1, GL2, . . GLn may include a pair of gate lines G(2i−1) and G(2i) (i=1, 2, . . . , n) electrically connected to each other. Each of the pair of gate lines G(2i−1) and G(2i) may extend in parallel to each other on the display panel 300 in the first direction D1. Each of the pair of gate lines G(2i−1) and G(2i) may be positioned in different pixel rows, and may be electrically connected to the plurality of pixels PX included in the corresponding pixel rows. That is, each of the pair of gate lines G(2i−1) and G(2i) may be alternately positioned one of the pair of gate lines G(2i−1) or G(2i)per pixel row. A pair of gate lines G(2i−1) and G(2i) connected to one main gate line GL1, GL2, . . . G(Ln) may be physically and electrically connected to each other at the left and right edges of the display panel 300 to transmit the same gate signal.

A plurality of data lines D1 to D(2m) extend in the second direction D2 and may be positioned with two data lines per one pixel column. The number of a plurality of data lines D1 to D(2m) is twice the number of the pixel columns.

Two data lines D(2i−1) and D(2i) (i=1, 2, . . . , n) may be disposed between adjacent pixel columns. Data voltages of the same polarity may be applied to two data lines D(2i) and D(2i+1) positioned between the adjacent pixel columns. The data voltages of the different polarities may be applied to data lines D(2i−1) and D(2i) positioned at both sides of each pixel column. For example, a plurality of data voltages applied from the first data line D1 to the 2(m-th) data line D(2m) may have the polarities sequentially repeated in the order of positive and negative.

A plurality of data lines D1-D(2m) may include a pair of data lines D(2i−1) and D(2i) disposed at both sides of the pixel in the corresponding pixel column. Each pair of data lines D(2i−1) and D(2i) may include an odd-numbered data line D(2i−1) and an even-numbered data line D(2i). A pair of data lines D(2i−1) and D(2i) correspond to one pixel column. Each of a pair of data lines D(2i−1) and D(2i) corresponding to one pixel column may transmit different data voltages from each other. Each of a pair of data lines D(2i−1) and D(2i) corresponding to one pixel column may transmit the data voltage of the different polarities.

Each of a plurality of pixels PX may be connected to one of the data lines D(2i−1) and D(2i) on both sides of the. In this case, in each of the plurality of pixel rows, the connection direction between a plurality of pixels PX and a plurality of data lines D1 to D(2m) may be changed at a predetermined pixel column interval. Also, the connecting directions between a plurality of pixels PX and a plurality of data lines D1—D(2m) in the odd-numbered pixel rows adjacent in the second direction D2 may be opposite to each other. The connection direction between a plurality of pixels PX and a plurality of data lines D1—D(2m) in the even-numbered pixel rows adjacent in the second direction D2 may be opposite to each other. Also, a plurality of pixels PX of the odd-numbered pixel row and a plurality of pixel PX of the even-numbered pixel row are connected to the same main gate line GL1, GL2, . . . , G(Ln), and may be connected to the data lines D1—D(2m) extended in the different directions from the main gate line GL1, GL2, . . . , G(Ln).

According to an embodiment, the connection directions between a plurality of pixels PX of the odd-numbered pixel row and a plurality of data lines D1—D(2m) may be the same, and the connection direction between a plurality of pixels PX of the even-numbered pixel row and a plurality of data lines D1—D(2m) may be the same. Also, the connection directions between a plurality of pixels PX of the odd-numbered and the even-numbered pixel row and a plurality of data lines D1—D(2m) may be opposite to each other.

In FIG. 1, a pair of data lines D(2i−1) and D(2i) are shown to not overlap with the pixel PX included in the corresponding pixel column. However, according to an embodiment, a pair of data lines D(2i−1) and D(2i) may intersect the interior of the pixels PX included in the corresponding pixel column and overlap with a pixel electrode 191 (referring to FIG. 4, for example).

The gate driver GD is connected to the main gate lines GL1, GL2, . . . , G(Ln) of the display panel 300, and applies a gate signal consisting of a combination of a gate-on voltage Von which may turn on the transistor Q (referring to FIG. 3) and a gate-off voltage Voff that may turn off the transistor Q to the main gate lines GL1, GL2, . . . , GLn.

The data driver DD is connected to the data lines D1—D (2m) of the display panel 300 and applies the data voltage to the data lines D1—D(2m).

As above-described, according to the display device according to an embodiment, one main gate line $GL_1$, $GL_2$, . . . , $GL_n$ is connected to two pixel rows to apply the data voltage by two pixel rows, thereby reducing a time that the data voltage is applied.

Figure 2:
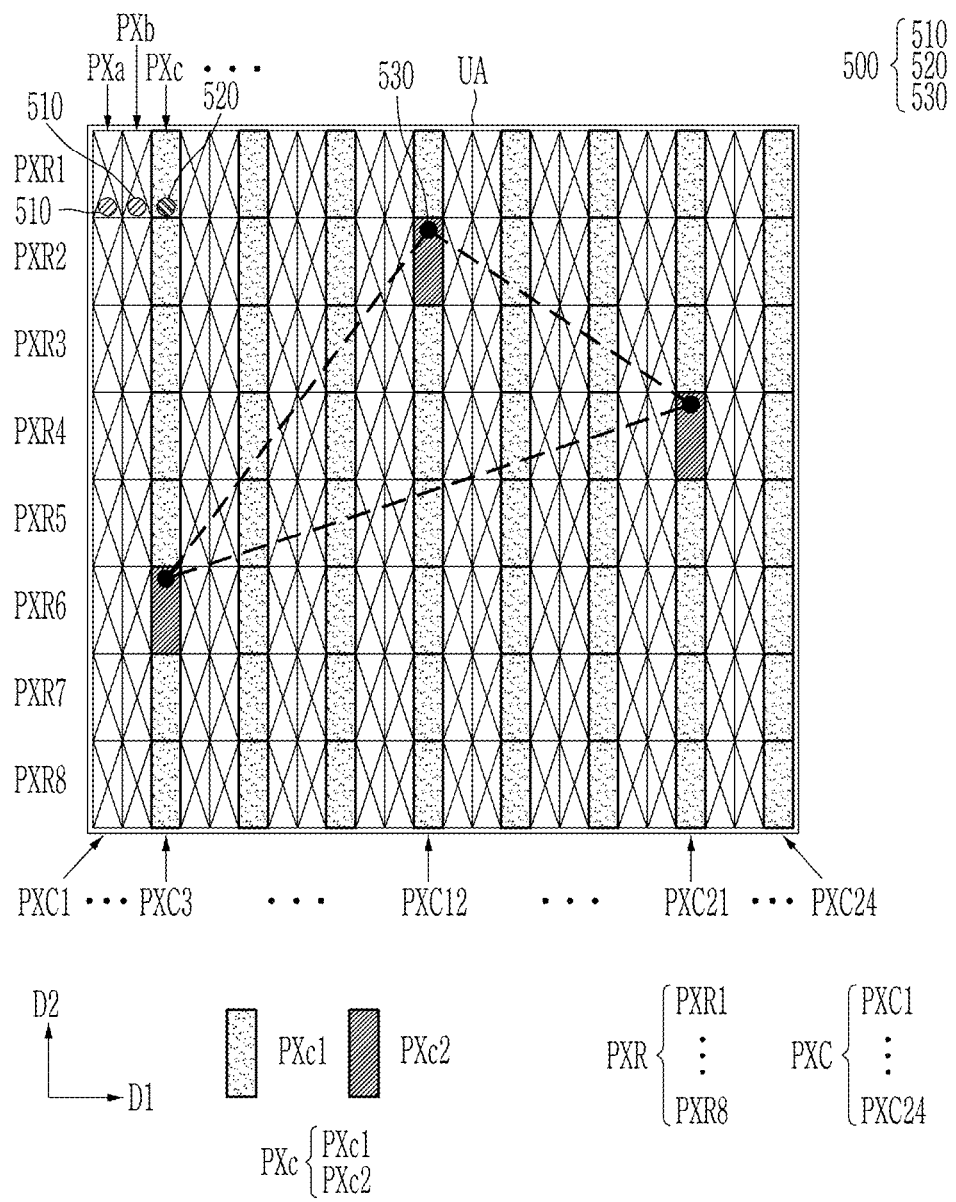
FIG. 2 is a plan view schematically showing a unit area UA of a display device according to an embodiment.

Next, the pixel arrangement of the display device according to an embodiment is described with reference to FIG. 2. FIG. 2 is a plan view schematically showing a unit area UA of a display device according to an embodiment.

Referring to FIG. 2, one unit area UA is shown, and the display device according to an embodiment includes a plurality of the unit areas UA. In the display panel, a plurality of unit areas UA may be arranged in a matrix shape having the row direction and the column direction.

Hereinafter, the unit area UA is an area including a plurality of pixels having one arrangement period in which a third spacer 530 is disposed.

The unit area UA may include a plurality of pixel rows PXR, along with pixel columns PXC that are grouped in multiples of three. In this case, among each pixel column PXC, a plurality of pixels disposed in the (3i−2)-th (hereinafter, i is a positive integer) pixel column are referred to as a first pixel PXa, a plurality of pixels disposed in the (3i−1)-th pixel column are referred to as a second pixel PXb, and a plurality of pixels disposed in the (3i)-th pixel column are referred to as third pixels PXc. That is, the first pixels PXa, the second pixels PXb, and the third pixels PXc may be repeatedly arranged in the first direction D1, and the pixels of the same kind of may be arranged in the same column.

The order of the arrangement of the first pixels PXa, the second pixels PXb, and the third pixels PXc in the first direction D1 may vary. As an example, the third pixels PXc representing blue may be disposed between the columns in which the first pixels PXa and the second pixels PXb are respectively disposed.

Each of the first pixel PXa, the second pixel PXb, and the third pixel PXc may display different colors from each other. For example, each the first pixel PXa and the second pixel PXb may display red or green. That is, the first pixel PXa may display red and the second pixel PXb may display green. The first pixel PXa may also display green and the second pixel PXb may display red.

Figure 3:
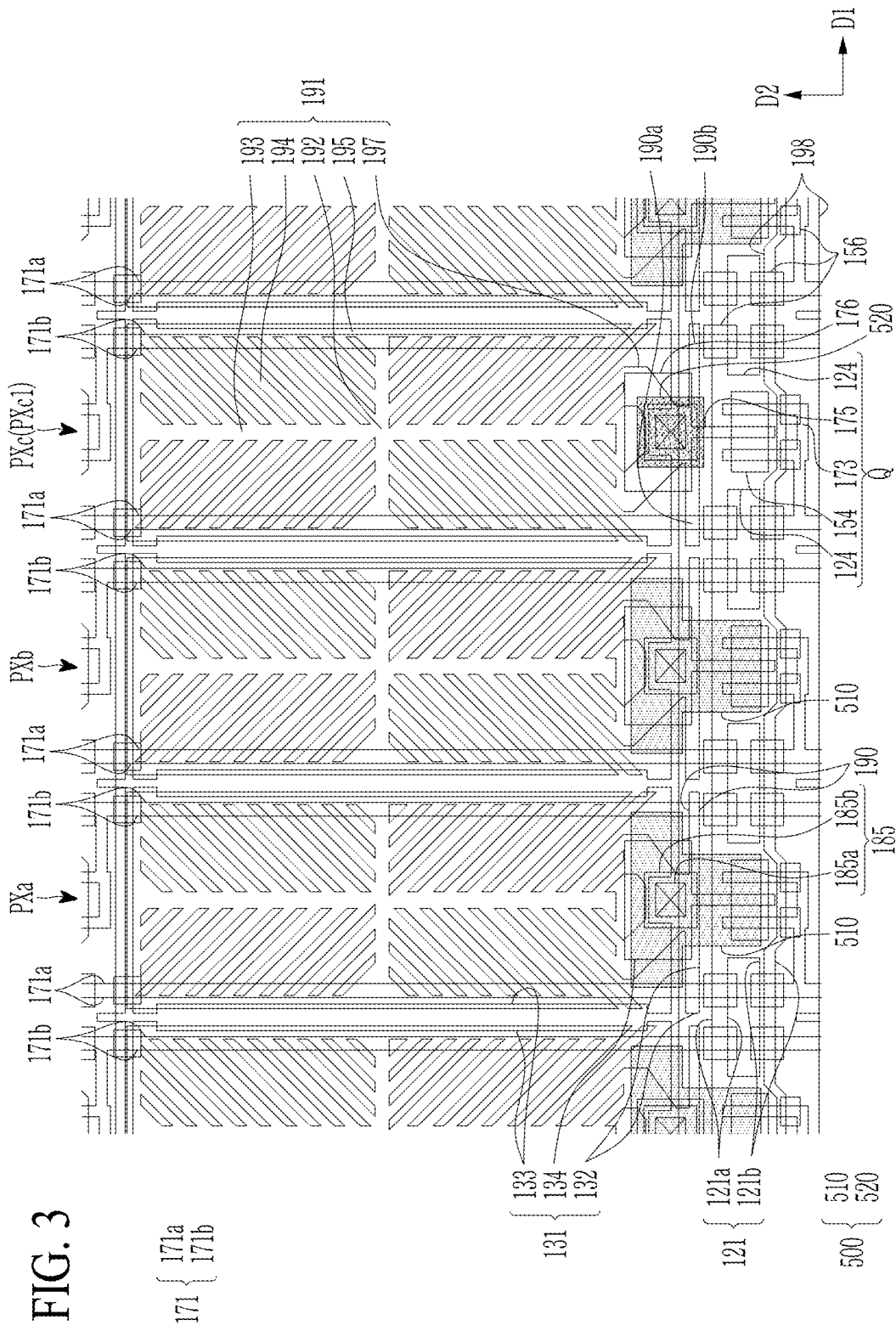
FIG. 3 is a plan view of three pixels of a display device according to an embodiment.

Each of the first pixel PXa, the second pixel PXb and the third pixel PXc includes a spacer 500 that overlaps at least a portion of the transistor Q of each pixel (referring to FIG. 3, for example). The spacer 500 includes a first spacer 510 included in the first pixel PXa and the second pixel PXb, and a second spacer 520 and a third spacer 530 included in the third pixel PXc. One of the first spacer 510, the second spacer 520, and the third spacer 530 is disposed in each pixel. The first spacer 510, the second spacer 520, and the third spacer 530 are spaced apart from each other.

Figure 5:
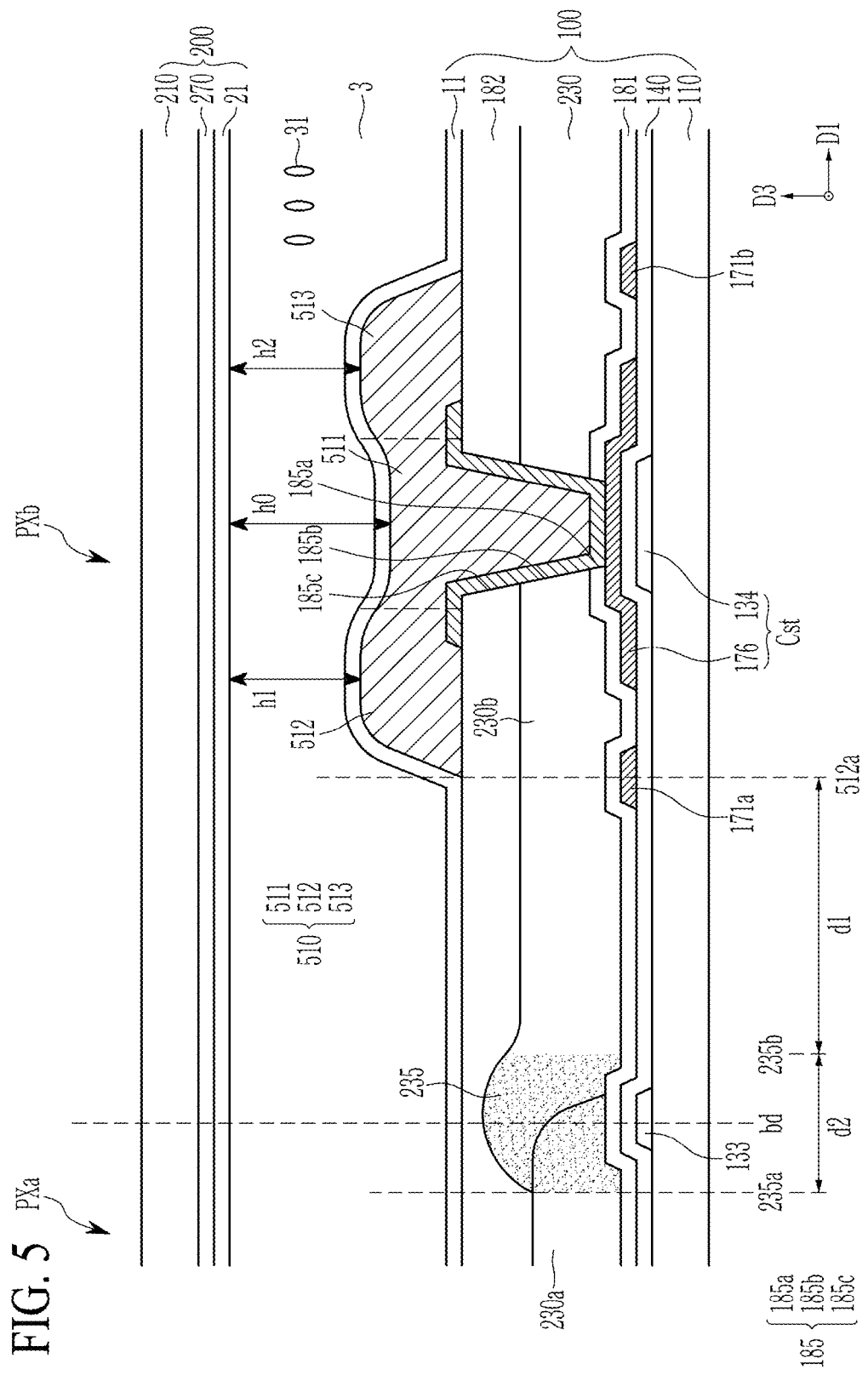
FIG. 5 is a cross-sectional view taken along a line V-V' of FIG. 4.
Figure 6:
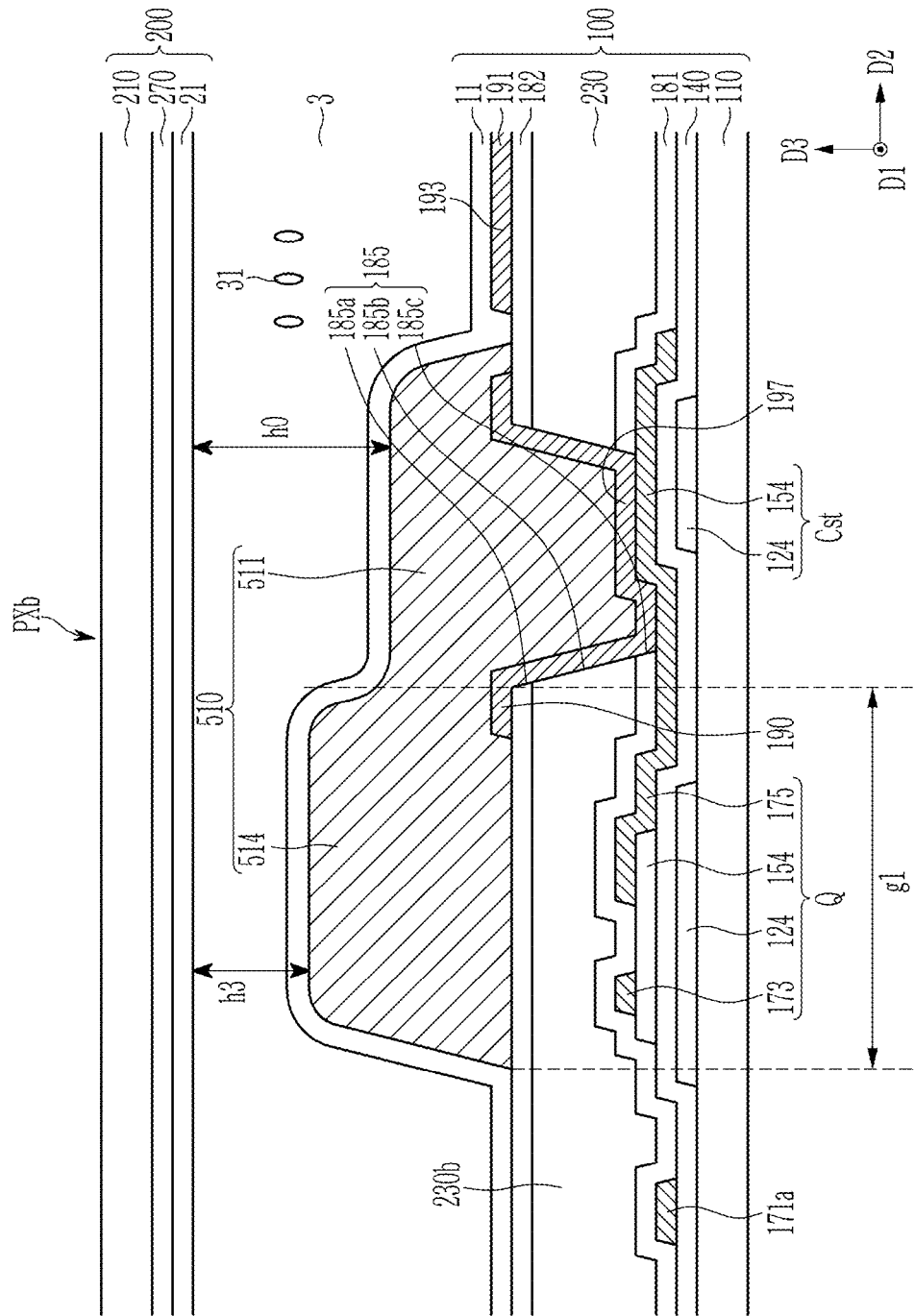
FIG. 6 is a cross-sectional view taken along a line VI-VI' of FIG. 4.

The first pixels PXa and the second pixels PXb include the first spacer 510, and the first spacer 510 is described in detail with reference to FIG. 4 to FIG. 6.

The third pixels PXc may display blue. The third pixels PXc are disposed in the (3i)-th pixel column, and includes a third/first pixel PXc1 and a third/second pixel PXc2 represented differently from each other. That is, at least one of the third pixels PXc may be a third/first pixel PXc1 and at least one of the third pixels PXc may be a third/second pixel PXc2. The number of third/first pixels PXc1 may be greater than the number of third/second pixels PXc2.

Each of the third/first pixel PXc1 and the third/second pixel PXc2 includes the second spacer 520 and the third spacer 530. The second and third spacers 520 and 530 are described in detail with reference to FIG. 7 to FIG. 10. The height of the third spacer 530 may be greater than the height of the second spacer 520.

In FIG. 2, the arrangement of the third/second pixels PXc2 is illustrated with a connecting dotted line for easy viewing. The third spacers 530 included in the third/second pixel PXc2 may be distributed in the same shape as shown by the dotted line in FIG. 2 (with the black dots indicating the pixel in which one third spacer 530 is placed), and this distribution period may be referred to as one arrangement period of the third spacers 530. According to the display device according to an embodiment, the unit area UA having one arrangement period is repeated such that the third spacers 530 are disposed with a constant period and are evenly distributed throughout the entire region of the display panel.

For example, referring to FIG. 2, a plurality of pixels included in the unit area UA may be arranged in a matrix form of 8 rows and 24 columns. The third pixel PXc may be disposed in the (3i)-th pixel column, and the third pixel PXc may include the third/second pixels PXc2 respectively disposed in the 6th row and 3rd column, the 2nd row and 12th column, and the 4th row and 21st column among the (3i)-th pixel column and the third/first pixel PXc1 disposed in the rest of the region where the third/second pixel PXc2 is not disposed among the (3i)-th pixel column. That is, three third/second pixels PXc2 may be included per unit area UA having the matrix form of the 8 rows and 24 columns.

The number of third/second pixels PXc2 may be determined as follows. A ratio of the area of the third spacer 530 for the area of the unit area UA may be about 0.03 to about 0.04. That is, the number of unit areas UA and third/second pixels PXc2 may be varied depending on the size of the display device, a resolution, and the area of the third spacer 530.

Next, the display device according to an embodiment is described in detail with reference to FIG. 3 to FIG. 6. FIG. 3 is a plan view of three pixels of a display device according to an embodiment, FIG. 4 is an enlarged plan view of a partial region of FIG. 3 as a plan view of two pixels of a display device according to an embodiment, FIG. 5 is a cross-sectional view taken along a line V-V' of FIG. 4, and FIG. 6 is a cross-sectional view taken along a line VI-VI' of FIG. 4.

Referring to FIG. 3 to FIG. 6, the display device according to an embodiment includes one of each of the first pixel PXa, the second pixel PXb, and the third pixel PXc adjacent in the first direction D1. Each of the pixel PXa, the second pixel PXb, and the third pixel PXc includes a gate line 121, a data line 171 crossing the gate line 121, the transistor Q connected to the gate line 121 and the data line 171, and the spacer 500.

The liquid crystal display according to an embodiment includes a first display panel 100 and a second display panel 200 overlapping each other, and a liquid crystal layer 3 interposed therebetween.

First, the first display panel 100 is described. The first display panel 100 includes a first substrate 110, and a gate conductive layer, a semiconductor layer 154, a data conductive layer, a color filter 230, a pixel electrode 191, and a spacer 500.

The gate conductive layer is disposed on the first substrate 110 made of transparent glass, plastic, and/or other similar materials. The gate conductive layer may include a gate line 121 and a storage electrode line 131.

The gate line 121 mainly extends in the first direction D1 and transmits the gate signal. The gate line 121 may correspond to the gate lines G1–G2n of FIG. 1. The gate line 121 may include a pair of sub-gate lines 121a and 121b and a gate electrode 124.

A pair of sub-gate lines 121a and 121b may extend parallel to each other in the first direction D1. The gate electrode 124 is disposed between a pair of sub-gate lines 121a and 121b, and the gate electrode 124 may be directly connected to the pair of sub-gate lines 121a and 121b. The pair of sub-gate lines 121a and 121b may transmit the same gate signal.

As such, when one gate line 121 is separated into a pair of sub-gate lines 121a and 121b, even if one sub-gate line 121a or 121b is damaged by a short circuit or the like, the other sub-gate line 121a or 121b may transmit the gate signal, which may be advantageous when repairing a display device.

The storage electrode line 131 is spaced apart from the gate electrode 124 and gate line 121 in a plan view. The storage electrode line 131 may extend mainly in the first direction D1 parallel to the gate line 121, and transmit a predetermined voltage such as a common voltage. The storage electrode line 131 may include a first storage electrode line 132 extending in the first direction D1, a second storage electrode line 133 connected to the first storage electrode line 132 and extending in the second direction D2, and a protrusion 134 protruded from the first storage electrode line 132. Referring to FIG. 4, the protrusion 134 has a first width w1 in the first direction D1.

The gate conductive layer may include a metal or metal alloy such as copper (Cu), molybdenum (Mo), aluminum (Al), silver (Ag), chromium (Cr), tantalum (Ta), titanium (Ti), and/or like materials, and may be formed of a single layer or multiple layers.

A gate insulating layer 140 is disposed on the gate conductive layer. The gate insulating layer 140 may include an inorganic insulating material such as a silicon oxide and a silicon nitride.

Semiconductor layers 154 and 156 are disposed on the gate insulating layer 140. The semiconductor layers 154 and 156 may include a semiconductor material such as an oxide semiconductor, amorphous silicon, and/or polycrystalline silicon. The semiconductor layer 154 forms the transistor Q. A plurality of semiconductor layers 156 are disposed at the region between the region where the gate line 121 and the data line 171 cross or between the region where the storage electrode line 131 and the data line 171 cross, thereby preventing an electric short between the gate conductive layer and the data conductive layer.

An ohmic contact (not shown) may be disposed on the semiconductor layers 154 and 156. When the semiconductor layers 154 and 156 include silicon, the ohmic contact (not shown) may include n+ hydrogenated amorphous silicon or a silicide in which an n-type impurity such as phosphorus (P) is doped at a high concentration.

A data conductive layer including a data line 171, a source electrode 173, and a drain electrode 175 is disposed on the semiconductor layers 154 and 156 and the gate insulating layer 140.

The data line 171 mainly extends in the second direction D2 perpendicular to the first direction D1, and may cross the gate line 121. The data line 171 may correspond to the data lines D1 to D(2m) shown in FIG. 1. The data line 171 may include a first data line 171a and a second data line 171b overlapping one pixel.

The source electrode 173 may be protruded from the data line 171 and be directly connected to the data line 171. In the present embodiment, although the source electrode 173 is connected to the first data line 171a disposed on the left side, the source electrode 173 may be connected to the second data line 171b disposed on the right side according to the pixel row. The source electrode 173 extends toward the gate electrode 124 and may be curved in an approximate U shape.

The drain electrode 175 is spaced apart from the source electrode 173, and may include an electrode extension part 176. The electrode extension part 176 may be disposed above the gate electrode 124 and the gate line 121 in the second direction D2 in a plan view. The region in which the source electrode 173 and the drain electrode 175 overlap the gate electrode 124 may overlap the semiconductor layer 154.

The electrode extension part 176 of the drain electrode 175 may overlap the protrusion 134 of the storage electrode line 131 and at least part of the first storage electrode line 132. The width in the first direction D1 of the electrode extension part 176 may be larger than the width in the first direction D1 of the protrusion 134. The electrode extension part 176 overlaps the protrusion 134 of the storage electrode line 131 via the gate insulating layer 140, thereby forming a storage capacitor Cst. The storage capacitor Cst may have a function of maintaining the voltage applied to the drain electrode 175 and the pixel electrode 191 connected to the drain electrode even when no data voltage is applied to the data line 171.

The data conductor may include a metal or metal alloys such as aluminum (Al), copper (Cu), silver (Ag), gold (Au), platinum (Pt), palladium (Pd), nickel (Ni), molybdenum (Mo), tungsten (W), titanium (Ti), chromium (Cr), and tantalum (Ta), and may be formed of a single layer or multiple layers.

Together with the semiconductor layer 154, The gate electrode 124, the source electrode 173, and the drain electrode 175 form the transistor Q. The channel of the transistor Q may be formed in the semiconductor layer 154 part between the source electrode 173 and the drain electrode 175. One pixel may be electrically connected to one of the first data line 171a and the second data line 171b through the transistor Q, but in FIG. 4, the case where the pixel is connected to the first data line 171a is described as an example.

A first insulating layer 181 may include an inorganic insulating material such as silicon oxide (SiOx), silicon nitride (SiNx) and/or an organic insulating material. The first insulating layer 181 may be disposed on the data conductive layer.

A color filter 230 is disposed on the first insulating layer 181. The color filter 230 includes a first color filter 230a and a second color filter 230b for displaying different colors. Since the first pixel PXa includes the first color filter 230a and the second pixel PXb includes the second color filter 230b, the first pixel PXa and the second pixel PXb may display different colors.

Two color filters 230 respectively included in the first pixel PXa and the second pixel PXb may overlap each other between the pixels PXa and PXb to form a step part 235. The height of the step part 235 may be higher than the height in the region where the adjacent color filters 230 do not overlap each other.

A second insulating layer 182 includes an inorganic insulating material such as a silicon oxide (SiOx), a silicon nitride (SiNx), and/or the organic insulating material. The second insulating layer 182 may be disposed on the color filter 230. For example, the second insulating layer 182 may include the organic insulating material to planarize the top of the color filter 230. In addition, the second insulating layer 182 may prevent the material of the color filter 230 from escaping to the liquid crystal layer 3.

The first insulating layer 181, the color filter 230, and the second insulating layer 182 include an opening 185 exposing the electrode extension part 176 of the drain electrode 175. The opening 185 is disposed on the electrode extension part 176 of the drain electrode 175 and may overlap the electrode extension part 176. The opening 185 may include a first opening 185a included in the first insulating layer 181, a second opening 185b included in the color filter 230, and a third opening 185c included in the second insulating layer 182. For convenience of illustration, in FIG. 3 and FIG. 4, only the first opening 185a and the second opening 185b are shown.

A pixel electrode layer including a pixel electrode 191, a shielding electrode 198, and a pixel dummy pattern 190 is disposed on the second insulating layer 182.

The pixel electrode 191 includes a cross-shaped stem part including a transverse stem part 192 and a longitudinal stem part 193, a plurality of minute branch parts 194 extending outward from the cross-shaped stem part, and an extension part 197 connected to the electrode extension part 176 of the drain electrode 175. The extension part 197 of the pixel electrode 191 is physically and electrically connected to the electrode extension part 176 of the drain electrode 175 through the opening 185 of the first insulating layer 181 and the color filter 230, in order to receive the data voltage. The pixel electrode 191 may have a structure in which the transverse stem part 192 and the minute branch parts 194 are connected to each other on both edges 195 such that both edges 195 are closed.

The shielding electrode 198 is spaced apart from the pixel electrode 191, and may extend in the first direction D1 and may be disposed in a region overlapping at least a portion of the gate line 121. The shielding electrode 198 may also be disposed in the second direction D2. The same voltage as that of a common electrode 270 included in the second display panel 200 described later may be applied to the shielding electrode 198. There is no electric field between the shielding electrode 198 and the common electrode 270. The liquid crystal between the shielding electrode 198 and the common electrode 270 correspond to a black state (e.g., allowing the display device to display a black color). As such, when the liquid crystal molecules 31 correspond to a black state, the liquid crystal molecules 31 may function as a light blocking member.

The pixel dummy pattern 190 extends in the first direction D1, and may be spaced apart from the pixel electrode 191 and the shielding electrode 198. The pixel dummy pattern 190 may be disposed between the gate line 121 and the storage electrode line 131. Both sides 190a and 190b of the pixel dummy pattern 190 may overlap at least part of the data lines 171a and 171b, respectively. The areas where both sides 190a and 190b overlap each data line 171a and 171b may be spaced apart from each other. Accordingly, the capacitance between the first data line 171a, which is a corresponding data line, and the second data line 171b, which is another data line, and the pixel electrode layer (for example, the pixel dummy pattern 190) may be adjusted by changing the overlapping areas.

The pixel electrode layers 190, 191, and 198 may include a transparent conductive material such as indium tin oxide (ITO) or indium zinc oxide (IZO), or a metal such as aluminum, silver, chromium, or an alloy of such metals.

The first spacer 510 overlapping the opening 185 is disposed on the second insulating layer 182 and the pixel electrode layers 190, 191, and 198. The first spacer 510 includes an overlapping part 511, a first extension part 512, a second extension part 513, and a third extension part 514, which are described in detail below with reference to FIG. 4 to FIG. 6. The description below is based on the first spacer 510 disposed in the second pixel PXb. The first spacer 510 disposed in the first pixel PXa may also have the same or similar features as the following description.

The overlapping part 511 may overlap the opening 185 for connecting the drain electrode 175 and the pixel electrode 191 and cover the opening 185. The overlapping part 511 may overlap the protrusion 134 of the storage electrode line 131, the electrode extension part 176 of the drain electrode 175, and the extension part 197 of the pixel electrode 191. In addition, the overlapping part 511 may overlap at least a portion of the first storage electrode line 132 extending in the first direction D1 of the storage electrode line 131.

The first extension part 512 extends from one side of the overlapping part 511 in the first direction D1.

The first spacer 510 is spaced apart from the step part 235 of the color filter 230 disposed at a boundary with the adjacent pixels PXa by a predetermined interval. The distance from an edge 512a of the first extension part 512 to the edge 235b of the step part 235 of the color filter 230 adjacent to the edge 512a is referred to as a first distance d1. The first distance d1 has a value of about 8.5 μm or more. That is, the minimum distance from at least one edge of the first extension part 512 and the second extension part 513 of the first spacer 510 to the edge of the closest step part 235 may be 8.5 μm.

The width of the color filter 230 in the first direction D1 of the step part 235 is referred to as a second distance d2. The second distance d2 is the distance between edges 235a and 235b of the step parts 235 disposed at each of the adjacent pixels PXa and PXb. The second distance d2 may be about 2 μm or more and about 6 μm or less. The second distance d2 may be, for example, about 4 μm. The distance from the boundary bd between the adjacent pixels PXa and PXb to each edge 235a and 235b of the step part 235 may be referred to as a third distance d3, and the third distance d3 may be half of the second distance d2. That is, the third distance d3 may be about 2 μm. Accordingly, the distance from the edge 512a of the first extension part 512 to the boundary bd between the adjacent pixels may be about 10.5 μm or more and 14.5 μm or less.

The first extension part 512 may overlap at least part of the first data line 171a.

The second extension part 513 extends from an other side of the overlapping part 511 in the first direction D1. That is, the second extension part 513 extends to the opposite side of the first extension part 512. Although not shown, the second extension part 513 is also spaced apart from the step part 235 of another adjacent color filter 230.

The second extension part 513 may overlap at least part of the second data line 171b.

The maximum distance from the upper surface of the overlapping part 511 to the second display panel 200 is referred to as a first height h0. The minimum distance from the upper surface of the first extension part 512 to the second display panel 200 is referred to as a second height h1. The minimum distance from the upper surface of the second extension part 513 to the second display panel 200 is referred to as a third height h2. Since the overlapping part 511 fills the opening 185, the height of the overlapping part 511 may be lower than the height of the extension parts 512 and 513 of both sides. In other words, the overlapping part 511 may be farther from the second display panel 200 than each of the two extension parts 512 and 513. That is, the first height h0 may be greater than the second height h1 and the third height h2.

The third extension part 514 extends from the overlapping part 511 in the second direction D2 perpendicular to the first direction D1. The third extension part 514 may overlap at least part of the transistor Q. In detail, the third extension part 514 may overlap at least part of the gate electrode 124, the semiconductor, the source electrode 173, and the drain electrode 175 of the transistor Q. As such, the third extension part 514 may serve as a sub-spacer to maintain a cell gap of the liquid crystal layer 3 by overlapping at least a portion of the transistor Q.

The third extension part 514 may have a first length g1 in the second direction D2.

The minimum distance from the upper surface of the third extension part 514 to the second display panel 200 is referred to as a fourth height h3. Since the overlapping part 511 of the first spacer 510 fills the opening 185 and the third extension part 514 overlaps the transistor Q, the height of the overlapping part 511 may be lower than that of the third extension part 514. In other words, the distance from the second display panel 200 to the overlapping part 511 may be greater than to the third extension part 514. That is, the first height h0 may be greater than the fourth height h3.

The first spacer 510 disposed at the second pixel PXb is spaced apart from the first spacer 510 disposed at the adjacent first pixel PXa.

Again referring to FIG. 4, the first spacer 510 disposed at the first pixel PXa and the second pixel PXb may have an approximate T-shaped plane.

A first alignment layer 11 may be disposed on the second insulating layer 182 and the first spacer 510. The first alignment layer 11 may be a vertical alignment layer.

In the liquid crystal display, the liquid crystal molecules 31 of the liquid crystal layer 3 interposed between two display panels 100 and 200 display different luminance, so the control of the arrangement of the liquid crystal molecules 31 is important. However, due to the step formed in the opening 185, the liquid crystal molecules 31 may be misaligned instead of being oriented in the target direction, thereby causing a problem in that the target luminance is not properly displayed. For example, the liquid crystal molecules 31 may be misaligned in the reverse direction toward the step of the opening 185 in the opening 185 peripheral area.

Therefore, according to the display device according to the embodiment, as the overlapping part 511 of the first spacer 510 covers the opening 185 to remove the step of the opening 185, the misalignment of the liquid crystal may be prevented, thereby properly displaying the image of the desired luminance. In addition, as the first spacer 510 includes the extension parts 512 and 513 that extend to both sides of the first direction D1 of the overlapping part 511, some of the steps disposed in the opening 185 peripheral area may be smoothed, thereby maximizing the control of the liquid crystal and improving the display quality and reliability.

In addition, the first spacer 510 extends in the second direction D2 and includes the third extension part 514 overlapping at least a portion of the transistor Q, thereby serving as the sub-spacer for uniformly maintaining the cell gap of the liquid crystal layer 3.

The second display panel 200 may include a second substrate 210 facing the first substrate 110, the common electrode 270 disposed below the second substrate 210, and a second alignment layer 21 disposed below the common electrode 270.

The liquid crystal layer 3 including the liquid crystal molecules 31 is disposed between the first display panel 100 and the second display panel 200. The liquid crystal layer 3 has negative dielectric anisotropy, and the liquid crystal molecules 31 of liquid crystal layer 3 are oriented so that their major axes are perpendicular to the surfaces of the two display panels 100 and 200 in the absence of an electric field. The pixel electrode 191 to which the data voltage is applied determines the direction of the liquid crystal molecules 31 of the liquid crystal layer 3 between the two electrodes 191 and 270 by generating the electric field along with the common electrode 270 of the second display panel 200. The luminance of light passing through the liquid crystal layer 3 varies according to the direction of the liquid crystal molecules 31 determined as described above.

Figure 7:
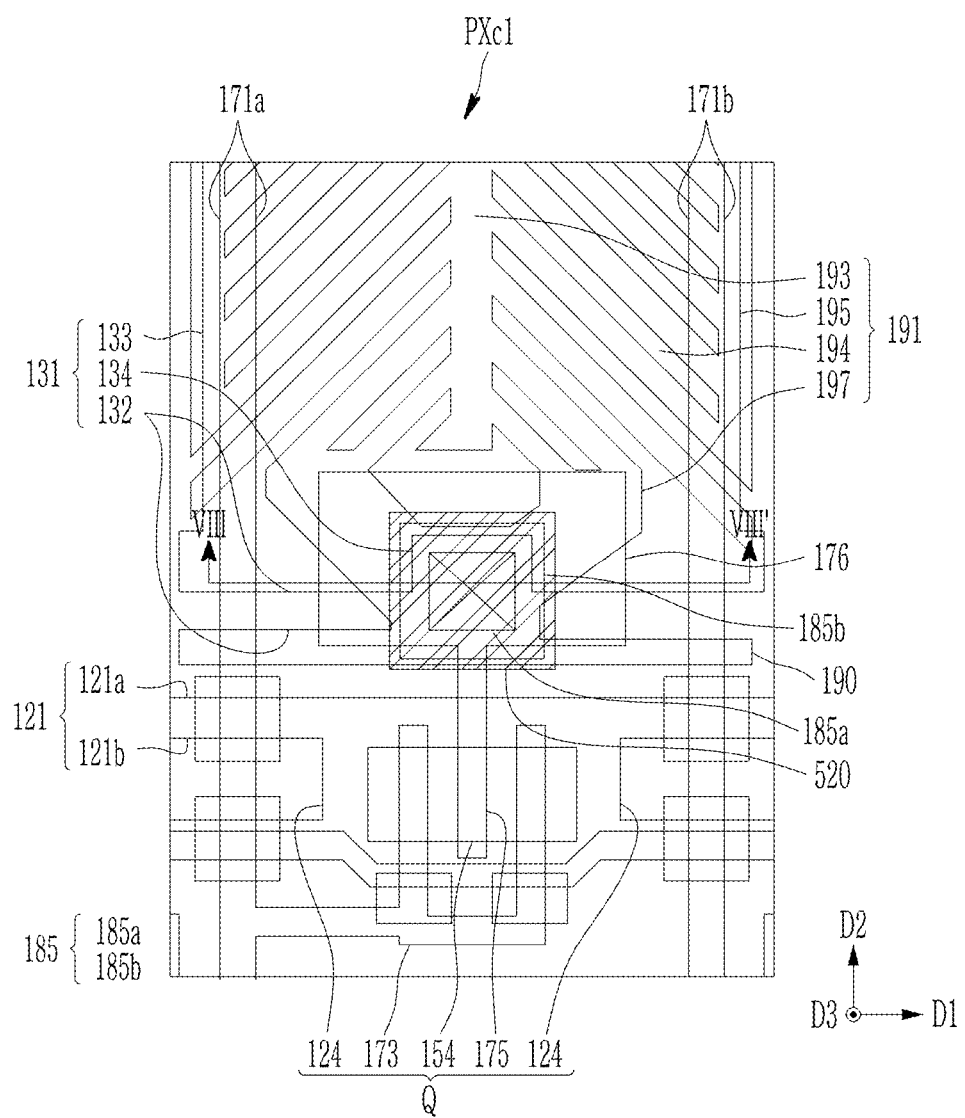
FIG. 7 is an enlarged plan view of a partial region of FIG. 3 as a plan view of one pixel of a display device according to an embodiment.
Figure 8:
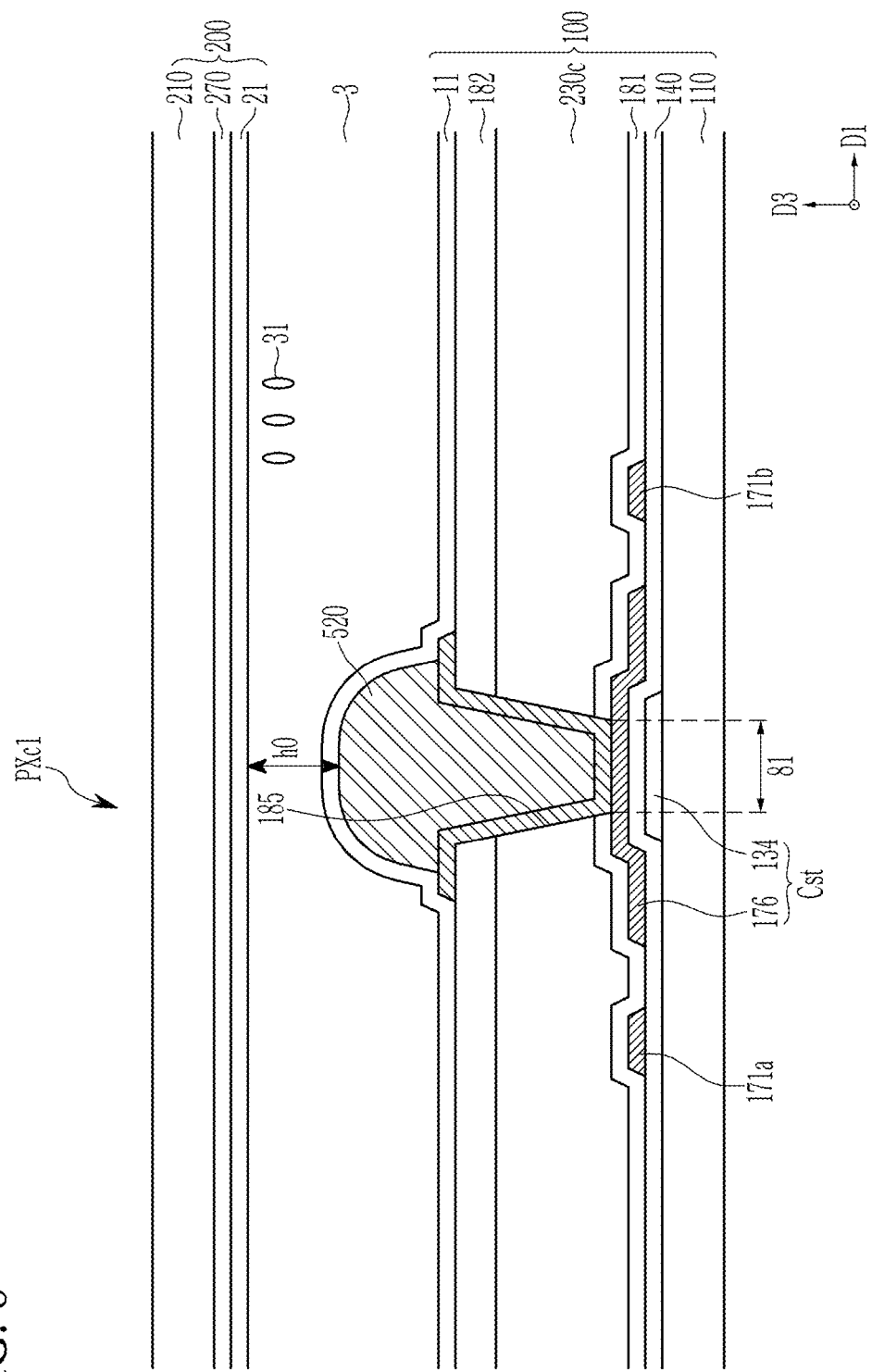
FIG. 8 is a cross-sectional view taken along a line VIII-VIII' of FIG. 7.

Next, the second spacer 520 according to an embodiment is described with reference to FIG. 7, FIG. 8, and FIG. 3. FIG. 7 is an enlarged plan view of a partial region of FIG. 3 as a plan view of one pixel of a display device according to an embodiment, and FIG. 8 is a cross-sectional view taken along a line VIII-VIII' of FIG. 7. Hereinafter, features distinguished from the above-described embodiment are mainly described, and the description of the same elements as in the above-described embodiment is omitted.

Referring to FIG. 7 and FIG. 8 along with FIG. 3, FIG. 7 and FIG. 8 show the third/first pixel PXc1 among the third pixel PXc included in FIG. 3. The third/first pixel PXc1 includes the second spacer 520.

The third/first pixel PXc1 includes the third color filter 230c. The third/first pixel PXc1 including the third color filter 230c may correspond to blue, e.g., transmit and/or display a blue color. The thickness of the third color filter 230c may be thicker than the thickness of the first color filter 230a of the first pixel PXa and the thickness of the second color filter 230b of the second pixel PXb as described above.

The second spacer 520 may overlap the opening 185 exposing the drain electrode 175. The second spacer 520 may cover the opening 185 included in the first insulating layer 181, the color filter 230, and the second insulating layer 182. The structure and/or the material of the second spacer 520 may be equal to that of the overlapping part 511 of the first spacer 510. Therefore, the minimum distance from the upper surface of the second spacer 520 to the second display panel 200 may be the first height h0 like the overlapping part 511 of the first spacer 510 described above.

The second spacer 520 may overlap each at least part of the protrusion 134 of the storage electrode line 131, the electrode extension part 176 of the drain electrode 175, and the extension part 197 of the pixel electrode 191.

Unlike the first spacer 510 described above, the second spacer 520 may not include the extension parts 512 and 513 extending to both sides of the overlapping part 511. That is, the second spacer 520 may have a smaller planar area than the first spacer 510. Since the thickness of the third color filter 230c included in the third/first pixel PXc1 is formed to be thicker than the first color filter 230a and the second color filter 230b, when the second spacer 520 includes the extension parts 512 and 513, the heights of the extension parts 512 and 513 may be excessively high, thereby increasing the misalignment of the liquid crystals. Accordingly, the second spacer 520 according to an embodiment may improve the controllability of the liquid crystal array by including only the overlapping part 511.

According to the display device according to an embodiment, the third/first pixel PXc1, which is included in the third pixels PXc, includes the second spacer 520 covering the opening 185, thereby preventing the misalignment of the liquid crystal by eliminating the step caused by the opening 185 and then improving the display quality.

Figure 9:
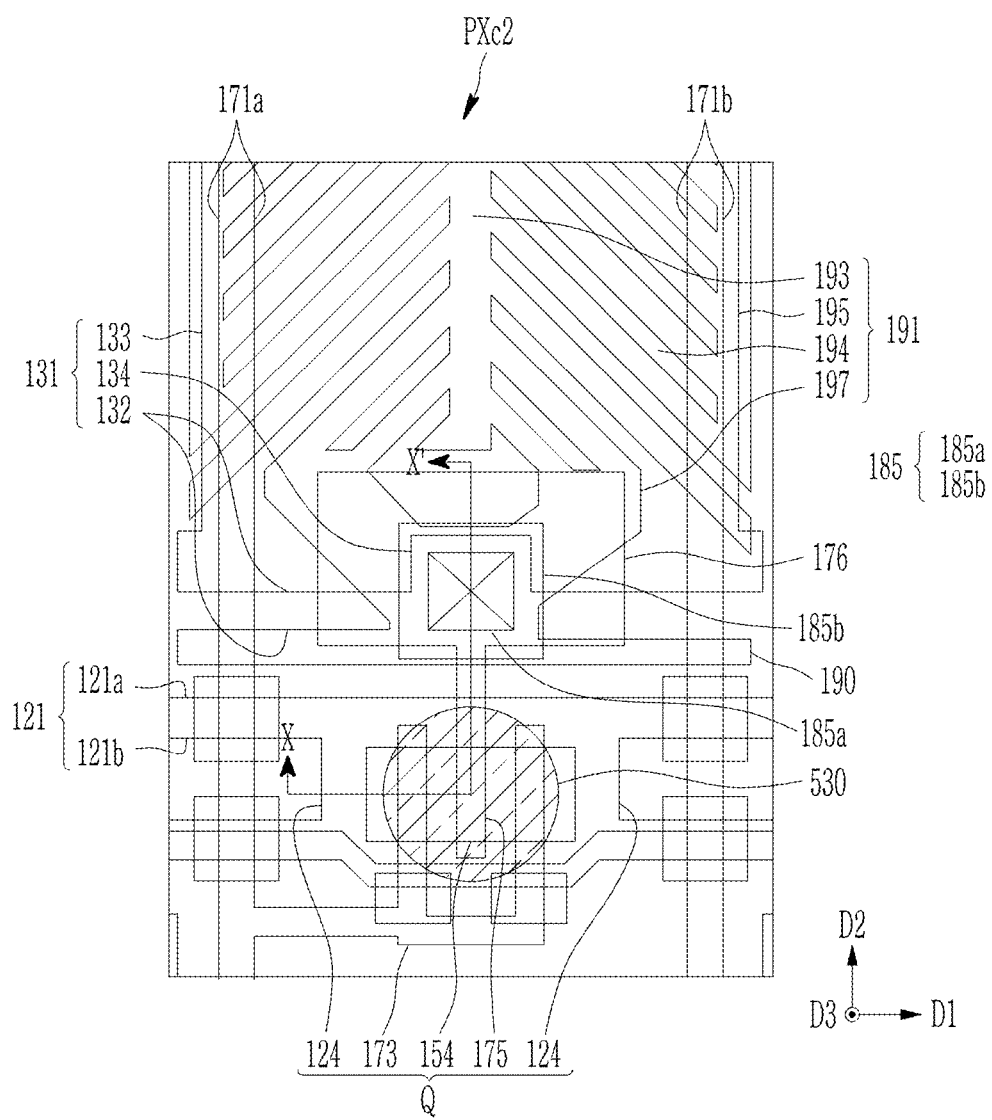
FIG. 9 is an enlarged plan view of a partial region of FIG. 3 as a plan view of one pixel of a display device according to an embodiment.
Figure 10:
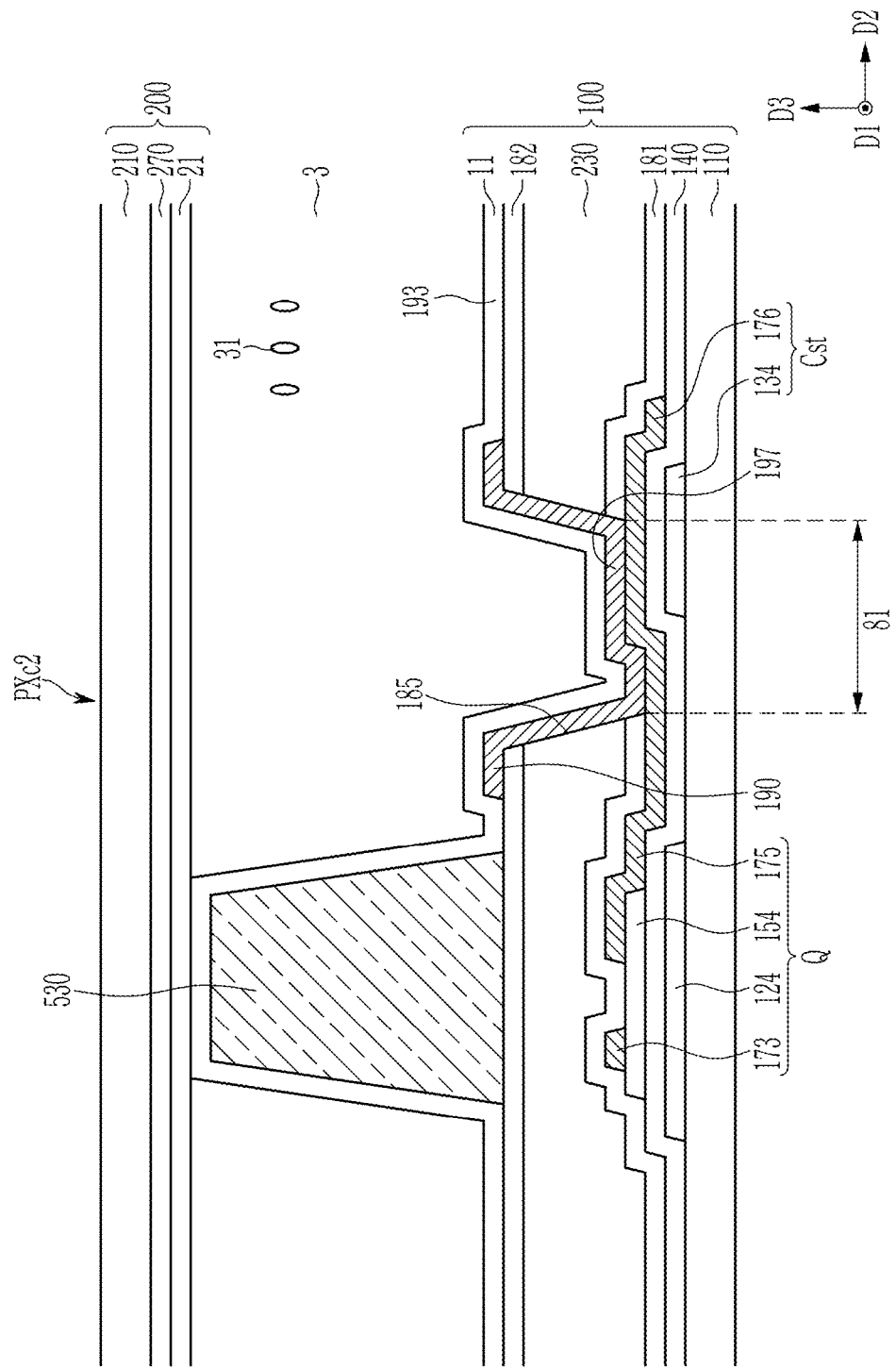
FIG. 10 is a cross-sectional view taken along a line X-X' of FIG. 9.

Next, the third spacer 530 according to an embodiment is described with reference to FIG. 9, FIG. 10, and FIG. 3. FIG. 9 is an enlarged plan view of a partial region of FIG. 3 as a plan view of one pixel of a display device according to an embodiment, and FIG. 10 is a cross-sectional view taken along a line X-X' of FIG. 9. Hereinafter, features distinguished from the above-described embodiment are mainly described, and the description of the same elements as in the above-described embodiment is omitted.

FIG. 9 and FIG. 10 show the third/second pixel PXc2 instead of the third/first pixel PXc1.

Like the third/first pixel PXc1, the third/second pixel PXc2 may also include the third color filter 230c displaying blue. Among the plurality of third pixels PXc, the number of third/second pixels PXc2 may be smaller than the number of third/first pixels PXc1.

The third spacer 530 may overlap at least part of the transistor Q in the third pixel PXc. Specifically, the third spacer 530 may overlap each at least part of the gate electrode 124, the semiconductor, the source electrode 173, and the drain electrode 175. As such, since the third spacer 530 overlaps the transistor Q with the thickest third color filter 230c, the third spacer 530 may serve as the main spacer for maintaining the cell gap of the liquid crystal layer 3.

The height of the third spacer 530 may be higher than the height of each of the first spacer 510 and the second spacer 520 described above. The third spacer 530 may be in contact with the second display panel 200 with its upper surface via alignment layers 11 and 21 interposed between.

The third/second pixel PXc2 may include only the third spacer 530 described above, and may not include the first spacer 510 and the second spacer 520. The opening 185 of the third/second pixel PXc2 may remain uncovered and the step may not be removed. Accordingly, in the third/second pixel PXc2, the misalignment of the liquid crystal molecules 31 may occur due to the step of the opening 185. If the liquid crystal molecules 31 are misaligned, dark portions ds1 and ds2 (referring to FIG. 11) may appear in the opening region on the third/second pixel PXc2, thereby causing a bruising phenomenon.

However, as described above in FIG. 2, the third/second pixel PXc2 may exist in a very small number compared to the area of the unit area UA of the display panel 300. Therefore, the bruising phenomenon due to the misalignment of the liquid crystal of the third/second pixel PXc2 may not be visually perceived by, for example, a user of the display device. Specifically, if the difference between the transmittance is about 10% or less, and particularly about 8% or less when the opening 185 is covered and not covered, the bruising phenomenon may not be visually perceived.

The first pixel PXa and the second pixel PXb include the first spacer 510, the third/first pixel PXc1 of the third pixel PXc includes second spacer 520, and the third/second pixel PXc2 of the third pixel PXc includes the third spacer 530.

The first spacer 510 includes the overlapping part 511, the extension parts 512 and 513 extending to both sides of the first direction D1 from the overlapping part 511, and the third extension part 514 extending from the overlapping part 511 in the second direction D2, thereby having the approximate T-shape on a plane. By covering the opening 185 and removing the step of the opening 185, the first spacer 510 may improve the control force of the liquid crystal by. Furthermore, the first spacer 510 may function as the sub-spacer to maintain the uniform cell gap of the liquid crystal layer 3 by overlapping the transistor Q. The second spacer 520 may minimize the step by covering the opening 185 without including the extension parts 512 and 513 on the thick third color filter 230c, thereby improving the control force of the liquid crystal. The third spacer 530 overlaps the transistor Q and is formed with the highest height, thereby serving as the main spacer for maintaining the cell gap of the liquid crystal layer 3 to be uniform.

As such, the display device according to an embodiment minimizes liquid crystal misalignment by disposing the spacers 510, 520, and 530 differently for each pixel PXa, PXb, and PXc, thereby optimizing the control force of the liquid crystal, and resultantly the display quality and the reliability may be improved.

Figure 11:
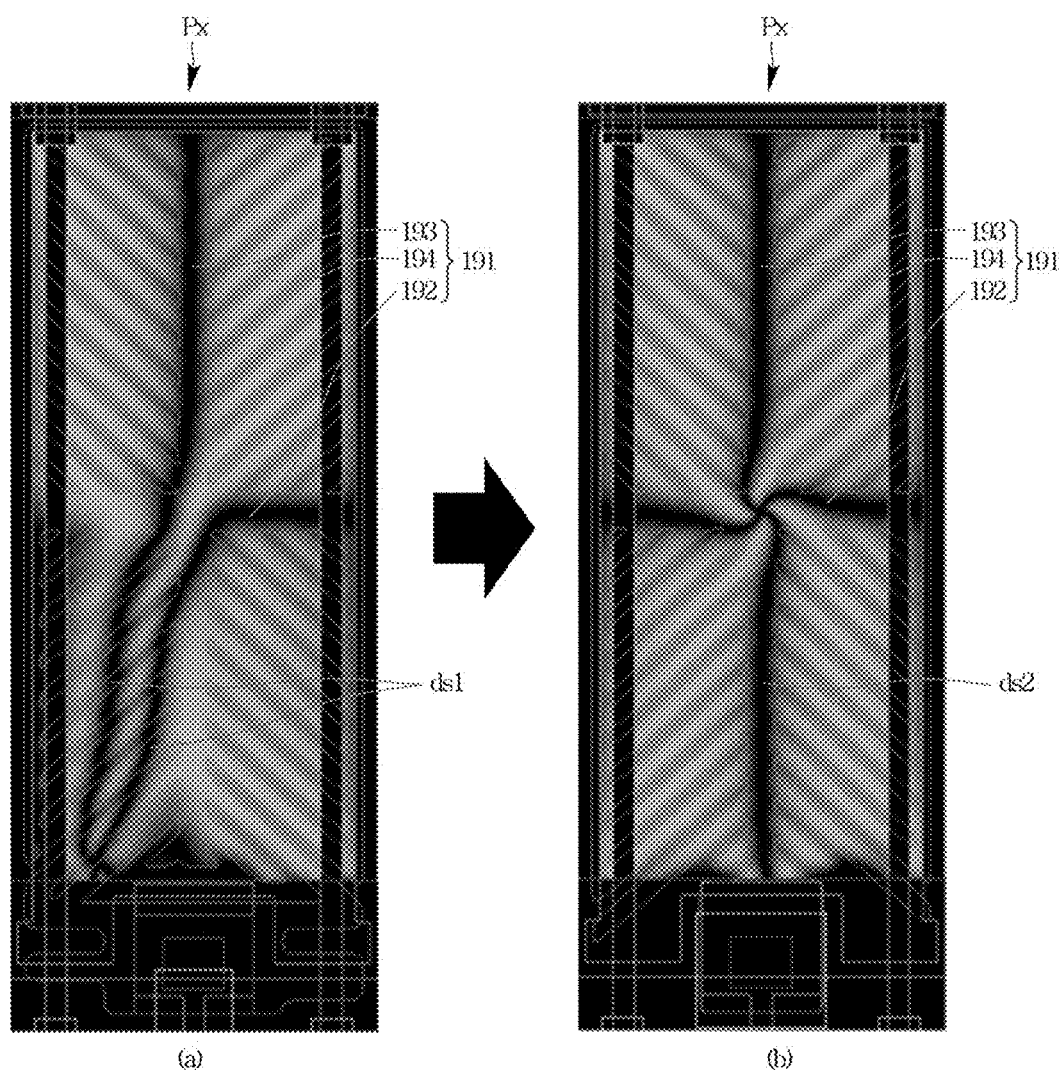
FIG. 11 is an image showing a texture simulation result of one pixel of a display device according to an embodiment.

Hereinafter, a benefit of the display device according to an embodiment is described with reference to FIG. 11. FIG. 11 is an image showing a texture simulation result of one pixel of a display device according to an embodiment.

Referring to FIG. 11, one pixel according to an embodiment may include the cross-shaped stem part including the transverse stem part 192 and the longitudinal stem part 193, and the minute branch parts 194 extending from the cross-shaped stem part. One pixel shown in FIG. 11 may be one among the first pixel PXa, the second pixel PXb, and the third pixel PXc as described above.

FIG. 11 (a) is a view showing a texture simulation result when one pixel does not include the spacer covering the opening 185 included therein. The spacer may be the first spacer 510 or the second spacer 520. In the pixel of FIG. 11 (a), the defect appears on the liquid crystal arrangement due to the opening 185 such that a dark portion ds1 is formed on the minute stem part region of the pixel electrode 191. The dark portion ds1 is formed in the opening region where the minute stem part is disposed, so that the texture defects in which a bruising phenomenon is visually perceived may occur.

FIG. 11 (b) is a view showing a texture simulation result when the pixel includes the spacer covering the opening 185 included therein. The spacer may be the first spacer 510 or the second spacer 520. In the pixel of FIG. 11 (b), as the step due to the opening 185 is removed by the spacer, the misalignment of the liquid crystal is prevented so that the dark portion ds2 is formed only on the cross-shaped stem part of the pixel electrode 191, thereby preventing the occurrence of bruising, and displaying the image normally.

Figure 12:
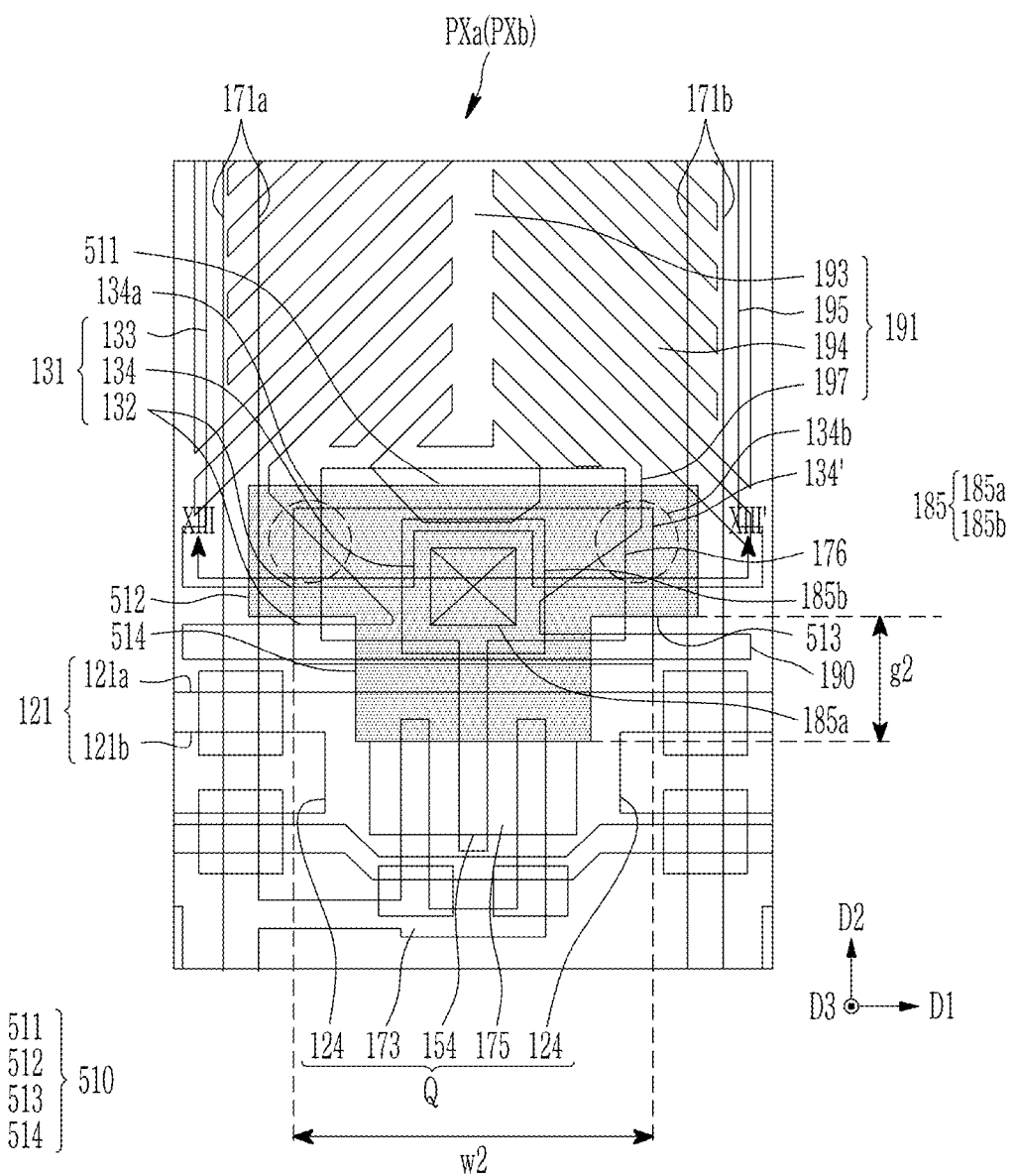
FIG. 12 is a plan view of a display device according to another embodiment.
Figure 13:
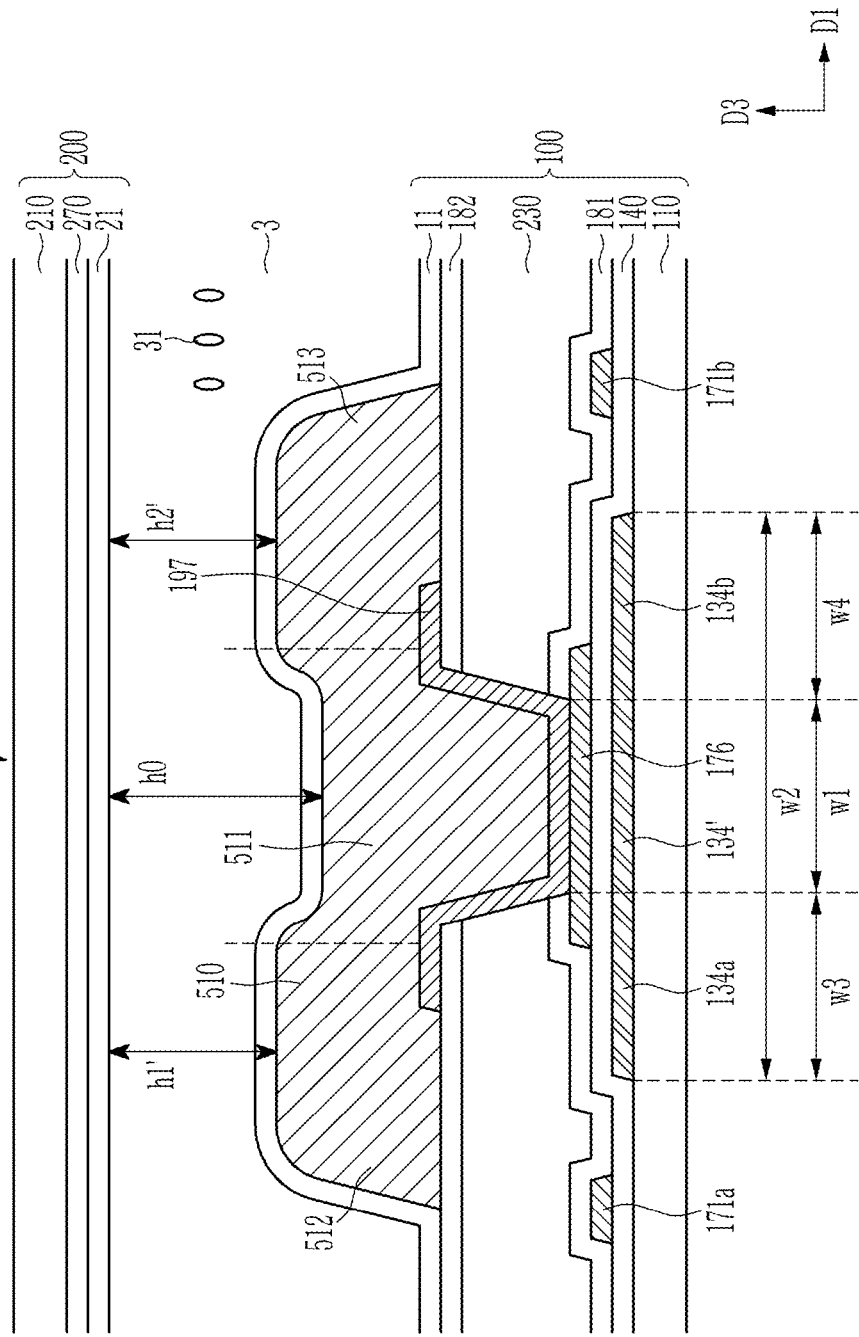
FIG. 13 is a cross-sectional view taken along a line XIII-XIII" of FIG. 12.

Next, the display device according to another embodiment is described with reference to FIG. 12 and FIG. 13. FIG. 12 is a plan view of a display device according to another embodiment, and FIG. 13 is a cross-sectional view taken along a line XIII-XIII" of FIG. 12. Hereinafter, features distinguished from the above-described embodiment are mainly described, and the description of the same elements as in the above-described embodiment is omitted.

Referring to FIG. 12 and FIG. 13, the first pixel PXa of the display device according to an embodiment includes the first spacer 510 including the overlapping part 511, the first extension part 512 and the second extension part 513 extending at both sides from the overlapping part 511, and the third extension part 514 extending from the overlapping part 511 in the second direction D2. The first spacer 510 may have an approximate T-shape on a plane. The overlapping part 511 may have the upper surface separated from the second display panel 200 by a first height h0, the first extension part 512 may have the upper surface separated from the second display panel 200 by a second height h1', and the second extension part 513 may have the upper surface separated from the second display panel 200 by a third height h2'. The pixel of FIG. 12 and FIG. 13 may be the second pixel PXb.

The storage electrode line 131 includes a first storage electrode line 132 extending in the first direction D1, and a protrusion 134' protruded from the first storage electrode line 132. The protrusion 134' has a second width w2 in the first direction D1. The aforementioned protrusion 134 of FIG. 4 has the first width w1 in the first direction D1, and the width w2 of the protrusion 134' of the present embodiment is larger than the width w1 of the protrusion 134 of FIG. 4. In this case, the protrusion 134' may have a greater width than that of the electrode extension part 176 of the drain electrode 175. The protrusion 134' may not overlap the first data line 171a and the second data line 171b which are adjacent to both sides of the protrusion 134'.

The protrusion 134' may include a first portion 134a and a second portion 134b on both sides of the first direction D1. The first portion 134a and the second portion 134b have a third width w3 and a fourth width w4, respectively, and accordingly, the protrusion 134' may have the larger width than the first width w1 of the protrusion 134 of FIG. 4 by the sum of the third width w3 and the fourth width w4. The second height h1' and the third height h2' of the first spacer 510 may be smaller than each height h1 and h2 (referring to FIG. 4) of the embodiment of FIG. 4 due to each of the first portion 134*a* and the second portion 134*b*. That is, the heights of the first extension part 512 and the second extension part 513 of the first spacer 510 may be higher, thereby reinforcing the role of the sub-spacer that makes the cell gap of the liquid crystal layer 3 uniform.

Accordingly, again referring to FIG. 12, the length g2 in the second direction D2 of the third extension part 514 may be reduced. That is, the length g2 of the third extension part 514 in the embodiment of FIG. 12 may be less than the length g1 in the second direction D2 of the third extension part 514 shown in FIG. 4.

As the resolution of the display device becomes higher, the size of a plurality of pixels included in the display device becomes smaller. Therefore, according to the display device according to an embodiment, by expanding the width of the part of the gate conductive layer, the area of the third extension part 514 overlapping at least part of the transistor Q may be minimized, thereby advantageously realizing a higher resolution than the display device would have if the overlap were not minimized.

Figure 14:
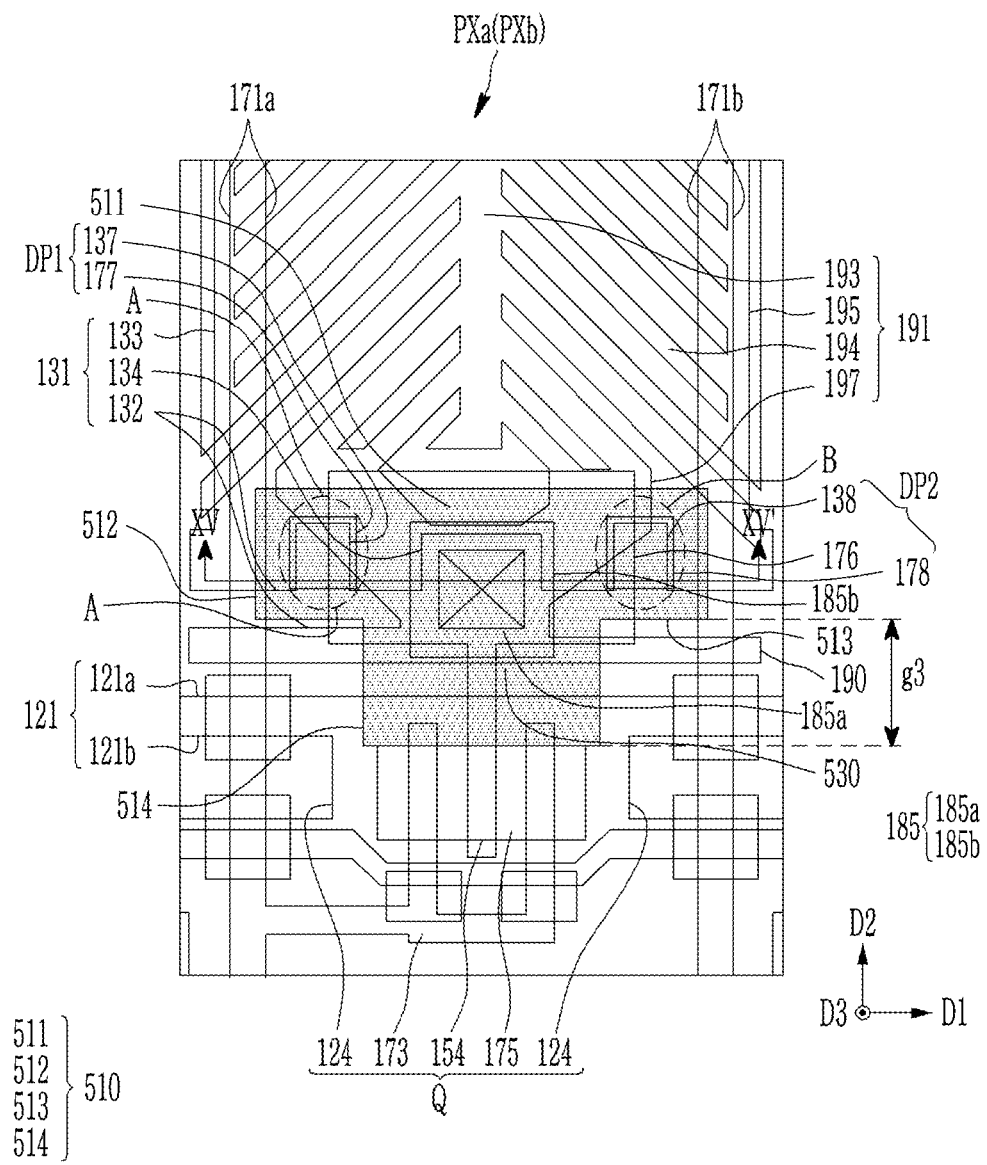
FIG. 14 is a plan view of a display device according to another embodiment.
Figure 15:
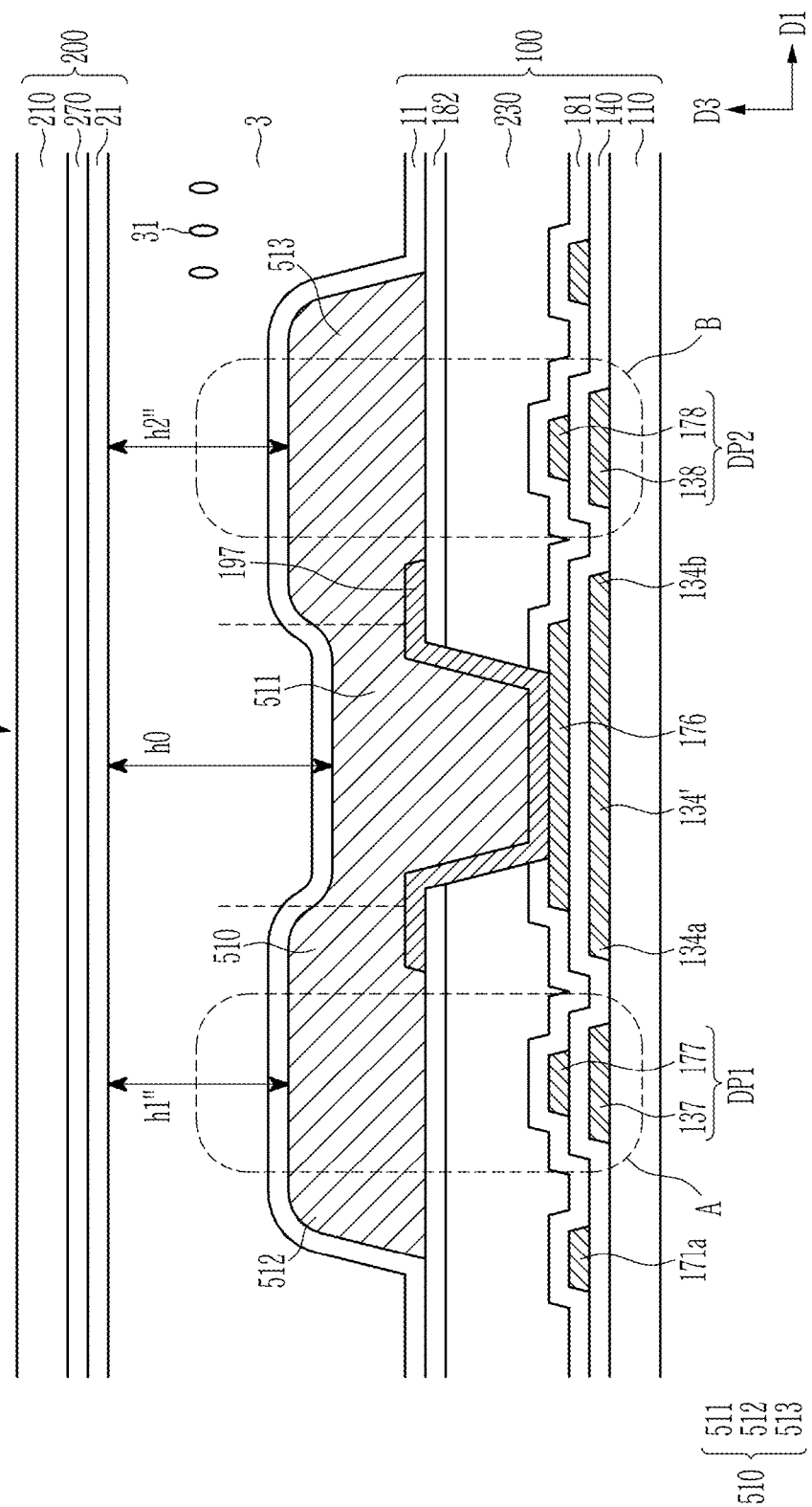
FIG. 15 is a cross-sectional view taken along a line XV-XV' of FIG. 14.

Next, the display device according to another embodiment is described with reference to FIG. 14 and FIG. 15. FIG. 14 is a plan view of a display device according to another embodiment, and FIG. 15 is a cross-sectional view taken along a line XV-XV' of FIG. 14. Hereinafter, features distinguished from the above-described embodiment are mainly described, and the description of the same elements as in the above-described embodiment is omitted.

Referring to FIG. 14 and FIG. 15, the first pixel PXa or the second pixel PXb includes the first spacer 510 including the overlapping part 511, the first extension part 512, the second extension part 513, and the third extension part 514.

In the present embodiment, the gate conductive layer includes a first gate dummy pattern 137 and a second gate dummy pattern 138. The first gate dummy pattern 137 and the second gate dummy pattern 138 are separated from the storage electrode line 131, the gate line 121, and the gate electrode 124. The first gate dummy pattern 137 may overlap the first extension part 512 of the first spacer 510, and the second gate dummy pattern 138 may overlap the second extension part 513 of the first spacer 510.

The data conductive layer includes a first data dummy pattern 177 and a second data dummy pattern 178. The first data dummy pattern 177 and the second data dummy pattern 178 are separated from the data lines 171*a* and 171*b*, the drain electrode 175, and the source electrode 173. The first data dummy pattern 177 may overlap the first gate dummy pattern 137, and the second data dummy pattern 178 may overlap the second gate dummy pattern 138.

The first gate dummy pattern 137 and the first data dummy pattern 177 form a first dummy pattern DP1. The second gate dummy pattern 138 and the second data dummy pattern 178 form a second dummy pattern DP2.

A maximum distance from the upper surface of the overlapping part 511 to the second display panel 200 is referred to as a first height h0.

The first extension part 512 overlaps the first dummy pattern DP1 in the region A. A minimum distance from the upper surface of the first extension part 512 to the second display panel 200 is referred to as a second height h1".

The second extension part 513 overlaps the second dummy pattern DP2 in the region B. The minimum distance from the upper surface of the second extension part 513 to the second display panel 200 is referred to as a third height h2".

The first height h0 may be larger than the second height h1" and the third height h2".

Figure 4:
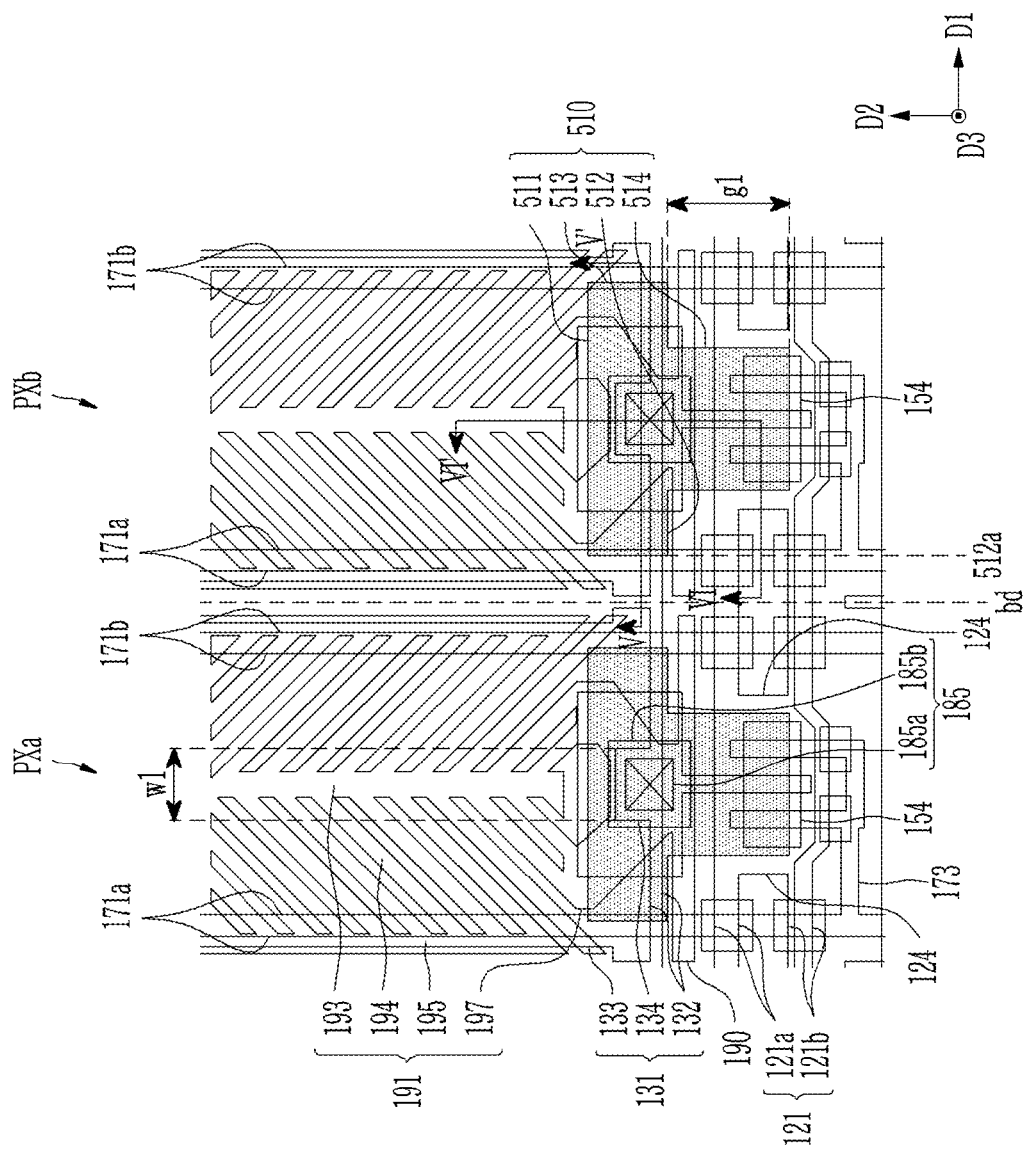
FIG. 4 is an enlarged plan view of a partial region of FIG. 3 as a plan view of two pixels of a display device according to an embodiment.

As each of the dummy patterns DP1 and DP2 overlaps each of the extension parts 512 and 513, the second height h1" and the third height h2" of the first spacer 510 may be smaller than in the embodiment of FIG. 4. That is, the heights of the first extension part 512 and the second extension part 513 of the first spacer 510 may be relatively higher, thereby reinforcing the role of the sub-spacer that makes the cell gap of the liquid crystal layer 3 uniform.

Accordingly, again referring to FIG. 14, the length g3 of the third extension part 514 in the second direction D2 may be reduced compared to when the dummy patterns DP1 and DP2 are not included. That is, the length g3 of the third extension part 514 shown in FIG. 14 may be less than length g1 in the second direction D2 of the third extension part 514 shown in FIG. 4.

As the resolution of the display device becomes higher, the size of a plurality of pixels included in the display device decreases. Therefore, according to the display device according to an embodiment, by forming the dummy pattern including the gate conductive layer and the data conductive layer, the area of the third extension part 514 overlapping at least part of the transistor Q may be minimized, thereby being advantageous to implement high resolution.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

<Description of symbols>

| | |
|---|---|
| 100: first display panel | 200: second display panel |
| 300: display panel | PXa: first pixel |
| PXb: second pixel | PXc: third pixel |
| PXc1: third/first pixel | PXc2: third/second pixel |
| 500: spacer | 510: first spacer |
| 520: second spacer | 530: third spacer |
| 511: overlapping part | 512: first extension part |
| 513: second extension part | 514: third extension part |
| 185: opening | 230: color filter |
| 230a: first color filter | 230b: second color filter |
| 230c: third color filter | 235: step part |
| 137, 138: gate dummy pattern | 177, 178: data dummy pattern |
| DP1, DP2: dummy pattern | |

What is claimed is:

1. A liquid crystal display comprising:
   a plurality of pixels comprising a first pixel, a second pixel, and third pixels, the third pixels comprise a third/first pixel and a third/second pixel including spacers that are different from each other,
   wherein each of the plurality of pixels comprises a transistor and an opening exposing at least a part of the transistor,
   wherein at least one of the first pixel and the second pixel comprises a first spacer, the third/first pixel comprises a second spacer having a smaller area than the first spacer in a plan view, the third/second pixel comprises a third spacer having a different height from the first spacer and the second spacer, wherein the first spacer and the second spacer overlap the opening of the pixel in which the first spacer and the second spacer are respectively disposed, and wherein the third pixels correspond to different colors from the first pixel and the second pixel.

2. The liquid crystal display of claim 1, further comprising:

a first display panel and a second display panel overlapping each other, wherein the first display panel comprises a color filter, the color filter comprises a first color filter disposed in the first pixel, a second color filter disposed in the second pixel, and a third color filter disposed in the third pixels, and a thickness of the third color filter is larger than a thickness of the first color filter and the thickness of the second color filter.

3. The liquid crystal display of claim 2, wherein the first pixel corresponds to red or green, the second pixel corresponds to a different color from the first pixel among the red or green, and wherein the third pixels correspond to blue.

4. The liquid crystal display of claim 3, wherein the first spacer comprises an overlapping part covering the opening, wherein a first extension part extending from one side of the overlapping part in a first direction, wherein a second extension part extending from an other side of overlapping part in the first direction, and wherein a third extension part extending from the overlapping part in a second direction perpendicular to the first direction.

5. The liquid crystal display of claim 4, wherein the first display panel comprises a data line and a gate line connected to the transistor, wherein the first pixel and the second pixel are adjacent to each other, wherein a step part where the first color filter and the second color filter are disposed is formed on a boundary of the first pixel and the second pixel, and wherein at least one edge of the first extension part and the second extension part of the first spacer is disposed to be separated from the edge of the step part closest to the edge.

6. The liquid crystal display of claim 4, wherein a maximum distance from an upper surface of the overlapping part to the second display panel is larger than a minimum distance from each upper surface of the first extension part and the second extension part to the second display panel.

7. The liquid crystal display of claim 6, wherein minimum distance from each upper surface of the first extension part and the second extension part to the second display panel is larger than a minimum distance from the upper surface of the third extension part to the second display panel.

8. The liquid crystal display of claim 4, wherein the first display panel comprises a first substrate and a gate conductive layer disposed on the first substrate and including a gate line, a gate electrode, and a storage electrode separated from the gate electrode, wherein a data conductive layer including a data line, a first electrode, and a second electrode is disposed on conductive layer, and wherein a pixel electrode is disposed on the data conductive layer, the gate electrode, the first electrode, and the second electrode form the transistor, wherein at least one of the first electrode and the second electrode is electrically connected to the pixel electrode through the opening, and wherein the overlapping part overlaps one of the gate electrode and the storage electrode, and the third extension part overlaps the other of the gate electrode and the storage electrode.

9. The liquid crystal display of claim 3, wherein a height of the third spacer is higher than a height of the first spacer and a height of the second spacer.

10. The liquid crystal display of claim 8, wherein the third spacer does not overlap the opening comprised in the third/second pixel in which the third spacer is disposed.

11. A liquid crystal display comprising:

a plurality of pixels comprised in a first display panel; and a second display panel overlapping the first display panel, wherein the first display panel comprises a transistor, a data line and a gate line connected to the transistor, an opening exposing at least a part of the transistor, and a first spacer overlapping at least a part of the transistor, and wherein the first spacer comprises:

an overlapping part overlapping the opening;

a first extension part extending from one side of the overlapping part in a first direction;

a second extension part extending from an other side of the overlapping part in the first direction; and a third extension part extending from the overlapping part in a second direction perpendicular to the first direction.

12. The liquid crystal display of claim 11, wherein the plurality of pixels comprise a first pixel and a second pixel adjacent to the first pixel, wherein the first pixel and the second pixel comprise the first spacer, and wherein the first spacer respectively in the first pixel and the second pixel is separated from each other per each pixel.

13. The liquid crystal display of claim 12, wherein the first display panel comprises a color filter, the color filter comprises a first color filter disposed on the first pixel and a second color filter disposed on the second pixel, wherein a step part where the first color filter and the second color filter are overlapped is disposed on a boundary of the adjacent first pixel and second pixel, and wherein at least one edge of the first extension part and the second extension part of the first spacer is disposed to be separated from the edge of the step part closest to the edge.

14. The liquid crystal display of claim 13, wherein the first display panel comprises a first substrate and a gate conductive layer disposed on the first substrate and including the gate line, a gate electrode, and a storage electrode separated from the gate electrode, wherein a data conductive layer including the data line, a first electrode, and a second electrode is disposed on the gate conductive layer, wherein a pixel electrode is disposed on the data conductive layer, wherein the gate electrode, the first electrode, and the second electrode form the transistor, wherein at least one of the first electrode and the second electrode is electrically connected to the pixel electrode through the opening, and wherein the overlapping part overlaps one of the gate electrode and the storage electrode, and the third extension part overlaps the other of the gate electrode and the storage electrode.

15. The liquid crystal display of claim 12, wherein the first pixel and the second pixel correspond to red or green.

16. The liquid crystal display of claim 14, wherein the gate conductive layer comprises a first gate dummy pattern overlapping the first extension part and a second gate dummy pattern overlapping the second extension part, wherein the data conductive layer comprises a first data dummy pattern overlapping the first gate dummy pattern and a second data dummy pattern overlapping the second gate dummy pattern, and wherein a first dummy pattern comprises the first gate dummy pattern and the first data dummy pattern, and a second dummy pattern comprises the second gate dummy pattern and the second data dummy pattern.

17. The liquid crystal display of claim 16, wherein a minimum distance from each upper surface of the first extension part and the second extension part to the second display panel is smaller than a maximum distance from the upper surface of the overlapping part to the second display panel.

18. A liquid crystal display comprising:
a plurality of pixels comprise a first pixel and a second pixel corresponding to a same color; and
each of the plurality of pixels comprises a transistor and an opening exposing at least a part of the transistor,
wherein the first pixel comprises a first spacer overlapping the opening,
wherein the second pixel comprises a second spacer,
wherein a height of the second spacer is higher than a height of the first spacer, and
wherein the second pixel does not have a spacer overlapping the opening.

19. The liquid crystal display of claim 18, wherein the first pixel and the second pixel correspond to blue.

20. The liquid crystal display of claim 19, wherein the first pixel and the second pixel are disposed in a same pixel column.

* * * * *